US011379339B2

(12) United States Patent
Udipi et al.

(10) Patent No.: US 11,379,339 B2
(45) Date of Patent: Jul. 5, 2022

(54) CONTROLLING SCREEN TIME BASED ON CONTEXT

(71) Applicant: Microsoft Technology Licensing, LLC, Redmond, WA (US)

(72) Inventors: Rahul Anantha Padmanabha Udipi, Cupertino, CA (US); Maxon Reave Wheeler, Los Gatos, CA (US); Christopher Yu, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/730,585

(22) Filed: Dec. 30, 2019

(65) Prior Publication Data
US 2021/0200657 A1 Jul. 1, 2021

(51) Int. Cl.
*G06F 11/34* (2006.01)
*G06F 21/62* (2013.01)

(52) U.S. Cl.
CPC ...... *G06F 11/3438* (2013.01); *G06F 11/3423* (2013.01); *G06F 21/62* (2013.01); *G06F 2221/2137* (2013.01); *G06F 2221/2149* (2013.01)

(58) Field of Classification Search
None
See application file for complete search history.

(56) References Cited

U.S. PATENT DOCUMENTS

| 9,152,694 B1 * | 10/2015 | Padidar | H04L 63/105 |
| 10,986,408 B1 * | 4/2021 | Randhawa | H04N 21/4821 |
| 2005/0080898 A1 * | 4/2005 | Block | G06F 16/9535 |
| | | | 709/225 |

(Continued)

FOREIGN PATENT DOCUMENTS

FR WO-2001052160 A1 * 7/2001 ............. G06Q 10/06

OTHER PUBLICATIONS

"Content-control software," available at https://en.wikipedia.org/wiki/Content-control_software, Wikipedia article, accessed on Dec. 30, 2019, 12 pages.

(Continued)

*Primary Examiner* — Lance Leonard Barry
*Assistant Examiner* — Mohammad Yousuf A. Mian

(57) ABSTRACT

A computer-implemented technique controls consumption of applications by a supervisee (e.g., a child). The technique detects when a supervisee attempts to interact with an application. In response, the technique receives context input signals that describe a current context affecting the supervisee. The technique then generates an output result based on the current context information and a set of rules expressed by rule logic. The technique then controls interaction by the supervisee with the application based on the output result. In one implementation, the technique automatically generates the rule logic, which may correspond to a set of discrete rules and/or a machine-trained model that implicitly expresses the rules. At least some of the rules specify amounts of time allocated to the supervisee for (Continued)

interaction with the plural applications in plural contexts. According to another illustrative aspect, the technique uses a machine-trained model to automatically classify a new application.

18 Claims, 14 Drawing Sheets

(56) References Cited

U.S. PATENT DOCUMENTS

| | | | | |
|---|---|---|---|---|
| 2006/0105795 | A1* | 5/2006 | Cermak | H04W 12/02 |
| | | | | 455/518 |
| 2011/0185399 | A1* | 7/2011 | Webber | H04L 63/104 |
| | | | | 726/4 |
| 2011/0310129 | A1 | 12/2011 | Nakahara | |
| 2012/0144346 | A1* | 6/2012 | Meredith | H04W 4/029 |
| | | | | 715/863 |
| 2012/0185782 | A1* | 7/2012 | Storage | G09B 29/006 |
| | | | | 715/757 |
| 2012/0237908 | A1 | 9/2012 | Fitzgerald et al. | |
| 2013/0047229 | A1* | 2/2013 | Hoefel | G06F 21/62 |
| | | | | 726/7 |
| 2014/0146074 | A1 | 5/2014 | Kwon | |
| 2014/0344951 | A1* | 11/2014 | Brewer | G06F 21/62 |
| | | | | 726/28 |
| 2017/0228463 | A1* | 8/2017 | Sharma | G06F 16/2477 |
| 2017/0250989 | A1* | 8/2017 | Bhattacharya | G06F 21/6218 |
| 2019/0272375 | A1 | 9/2019 | Chen | |
| 2019/0342344 | A1 | 11/2019 | Anton et al. | |
| 2020/0210549 | A1* | 7/2020 | Gupta | G06F 21/10 |

OTHER PUBLICATIONS

"Use parental controls on your child's iPhone, iPad, and iPod touch," available at https://support.apple.com/en-us/HT201304, Apple Inc., Cupertino, CA, Dec. 12, 2019, 6 pages.

"Screen Time Management," available at https://www.netnanny.com/features/time-management/, Net Nanny, Midvale, Utah, accessed on Dec. 30, 2019, 6 pages.

"Use Screen Time on your iPhone, iPad, or iPod touch," available at https://support.apple.com/en-us/HT208982, Apple Inc., Cupertino, CA, Dec. 10, 2019, 4 pages.

"Set up screen time limits for your child," available at https://support.microsoft.com/en-us/help/4028244/microsoft-account-set-up-screen-time-limits-for-your-child, Microsoft Corporation, Redmond, WA, Sep. 27, 2019, 2 pages.

"Qustodio, How Does it Work," available at https://www.qustodio.com/en/family/how-it-works/, Qustodio LLC, Redondo Beach, CA, accessed on Dec. 30, 2019, 6 pages.

"Mobicip, Features," available at https://www.mobicip.com/feature, Mobicip LLC, Newbury Park, CA, accessed on Jan. 6, 2020, 12 pages.

"Manage your child's screen time," available at https://support.google.com/families/answer/7103340?hl=en, Google Inc., Mountain View, CA, accessed on Dec. 30, 2019, 3 pages.

Zhu, Rui, "Managing Application Constraints across Platforms," U.S. Appl. No. 16/537,566, filed on Aug. 10, 2019, 66 pages.

"The Power of Mac. Taken further," retrieved from https://www.apple.com/macos/catalina/, accessed on Nov. 12, 2019, Apple Inc., Cupertino, CA, 39 pages.

"Website Blocker," retrieved from http://www.netnanny.com/features/website-blocker, Net Nanny, Midvale, Utah, accessed on Nov. 12, 2019, 10 pages.

Rubenking, Neil J., "Qustodio," retrieved from https://www.pcmag.com/review/330449/qustodio, PC Magazine, Oct. 24, 2019, 24 Pages.

PCT Search Report and Written Opinion for PCT/US2020/059256, dated Feb. 9, 2021, 13 pages.

* cited by examiner

Screen Time Limits — □ ×

For: Jill Smith
Jill9999zz@mymail.com  } 304
Teen: 13-17 yrs old 2 hrs 31 mins
Today's Screen Time

| By Apps | By Categories | By Loc | By Time | By Activity | • • • | } 308

" * " Means constraint is a default intelligent setting. To change, click on constraint.

| App | Category | Current Limits | Key | • • • |
|---|---|---|---|---|
| ⟩ MathHelp | Education* | 0 (block)*<br>None*<br>5 hr/wk/cat* | Driving blocked*<br>No limits at school*<br>All other usage* | } 312 |
| ⟩ Firefight | Gaming* | 0 (block)*<br>3 hr/wk/cat* | Driving blocked*<br>All other usage* | |
| ⟩ Netflix | Entertainment* | 0 (block)*<br>5 hr/wk/cat | All locations except home*<br>At home | } 320 |
| ⟩ Instagram | Social* | 0 (block)*<br>3.5 hr/wk/cat* | Driving blocked*<br>All other usage* | |
| | | Note: Includes 0.5 bonus this week because Jill exercised 4 hrs so far. | | } 324 |
| ⟩ Youtube | Entertainment* | 0 (block)*<br>None*<br>5 hr/wk/cat* | Driving blocked*<br>10-11am, M-F<br>All other usage* | } 322 |
| ⟩ MapHelp | Navigation* | None* | None* | |
| ⟩ PoliceCall | Safety* | | | |
| ⟩ FunGame | | | | |

OVERVIEW OF OPERATION OF THE COMPUTING ENVIRONMENT 1602

USE A MACHINE-TRAINED MODEL AND/OR HEURISTIC LOGIC TO AUTOMATICALLY CLASSIFY PLURAL APPLICATIONS, TO PROVIDE PLURAL CLASSIFIED APPLICATIONS.
1604

AUTOMATICALLY CONTROL ACCESS BY A PARTICULAR SUPERVISEE TO A CLASSIFIED APPLICATION BASED ON A CURRENT CONTEXT AFFECTING A PARTICULAR SUPERVISEE, AND BASED ON RULE LOGIC PROVIDED BY A TRAINING SYSTEM (SEE FIG. 16).
1604

GENERATE A REPORT THAT DESCRIBES AN AMOUNT OF TIME THAT THE SUPERVISEE HAS INTERACTED WITH AT LEAST ONE CLASSIFIED APPLICATION IN DIFFERENT RESPECTIVE CONTEXTS.
1606

FIG. 16

OVERVIEW OF OPERATION OF THE COMPUTING ENVIRONMENT 1702

RECEIVE RULE LOGIC, THE RULE LOGIC SPECIFYING AMOUNTS OF TIME ALLOCATED TO DIFFERENT KINDS OF SUPERVISEES FOR INTERACTION WITH PLURAL APPLICATIONS IN PLURAL CONTEXTS.
1704

RECEIVE AN APPLICATION INPUT SIGNAL THAT IDENTIFIES A CANDIDATE APPLICATION.
1706

RECEIVE CONTEXT INPUT SIGNALS FROM ONE OR MORE INPUT DEVICES, THE CONTEXT INPUT SIGNALS COLLECTIVELY PROVIDING CURRENT CONTEXT INFORMATION THAT DESCRIBES A CURRENT CONTEXT AFFECTING A PARTICULAR SUPERVISEE.
1708

GENERATE AN OUTPUT RESULT BASED ON THE CURRENT CONTEXT INFORMATION AND THE RULE LOGIC, THE OUTPUT RESULT SPECIFYING AN AMOUNT OF TIME THAT THE SUPERVISEE IS PERMITTED TO INTERACT WITH THE CANDIDATE APPLICATION IN THE CURRENT CONTEXT.
1710

CONTROL INTERACTION BY THE SUPERVISEE WITH THE CANDIDATE APPLICATION BASED ON THE OUTPUT RESULT.
1712

FIG. 17

CONTROLLING SCREEN TIME BASED ON CONTEXT

BACKGROUND

Computer-implemented tools currently exist for monitoring and controlling the manner in which users interact with computing technology. However, these tools may provide relatively coarse and inflexible control mechanisms that fail to adequately keep abreast of new applications and computing devices introduced to the marketplace. These tools may also provide code that fails to adapt to the ever-evolving manner in which users interact with their applications and computing devices.

SUMMARY

A computer-implemented technique is described herein by which a supervisor (e.g., a parent) may control the consumption of applications by a supervisee (e.g., a child of the parent). In one implementation, assume that the supervisee attempts to interact with an application. In response, the technique receives context input signals from one or more input devices, such as a location-determining device, a movement-detecting device, etc. The context input signals collectively provide context information that describes a current context affecting the supervisee. The technique then generates an output result based on the current context information and rules expressed by rule logic. The output result specifies an amount of time that the supervisee is permitted to interact with the candidate application in the current context (where that time may be zero in some cases). The technique then controls interaction by the supervisee with the application based on the output result. Control may take the form of allowing the supervisee to interact with the application, prohibiting the supervisee from interacting with the application, and/or reporting the supervisee's non-compliant interaction with an application, and so on. Through this process, the technique manages the amount of time ("screen time") in which the supervisee is given to interact with the application.

According to another illustrative aspect, a given rule expressed by the rule logic specifies an amount of time that the supervisee is permitted to interact with the candidate application at a specified location (such as a school-related location, a home-related location, etc.).

According to another illustrative aspect, a given rule expressed by the rule logic specifies an amount of time that the supervisee is permitted to interact with the candidate application at a specified time of day and/or day of the week, etc.

According to another illustrative aspect, a given rule expressed by the rule logic specifies an amount of time that the supervisee is permitted to interact with the application while engaged in a specified activity. In many cases, the permitted amount of time is zero, which effectively blocks the supervisee from interacting with application. This may be appropriate when the specified activity involves driving a vehicle.

According to another illustrative aspect, the current context that affects the supervisee can include information regarding the tasks that the supervisee has recently completed (such as exercise-related tasks, homework-related tasks, etc.). In some cases, the technique can determine the amount of screen time to be granted to the supervisee based on the prior actions of the supervisee.

According to another illustrative aspect, the rule logic may correspond to a set of discrete rules, and/or a machine-trained model that implicitly expresses the rules.

According to another illustrative aspect, the technique uses a machine-trained model and/or heuristic logic to automatically classify a new application that is identified. The technique performs this task based on plural application-classifying features associated with the new application. The application-classifying features can include, but are not limited to: information gleaned from the new application itself (e.g., as reflected in its metadata and other properties), information obtained from external descriptions of the new application (e.g., as provided by an application marketplace service), and information that describes how users have previously interacted with the new application in different contextual settings, etc.

According to another illustrative aspect, the technique involves generating a report that describes an amount of time that the supervisee has interacted with at least one application in different respective contexts. A supervisor may review the report and take appropriate action.

According to one advantage, the technique is expected to provide a control mechanism that flexibly and automatically adapts to new applications and devices introduced to the marketplace. The technique also automatically detects and adapts to new ways in which applications and devices are used within different environments by different supervisees. By doing so, the technique provides nuanced control of a supervisee's consumption of applications, e.g., by taking into account the cases in which applications are used in a school setting as part of the supervisee's curriculum. The technique can also provide an effective mechanism for alerting the supervisor to non-compliant behavior by the supervisee on a context-by-context basis.

The above-summarized technique can be manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIGS. 3-5 show three different user interface presentations that allow a supervisor to view and modify rules that have been automatically generated by the computing environment of FIG. 1.

FIG. 16 shows an overview of the operation of the computing environment of FIG. 1, according to one illustrative implementation.

FIG. 17 shows an overview of a controlling operation, corresponding to one of the blocks of FIG. 16.

Figure 1:
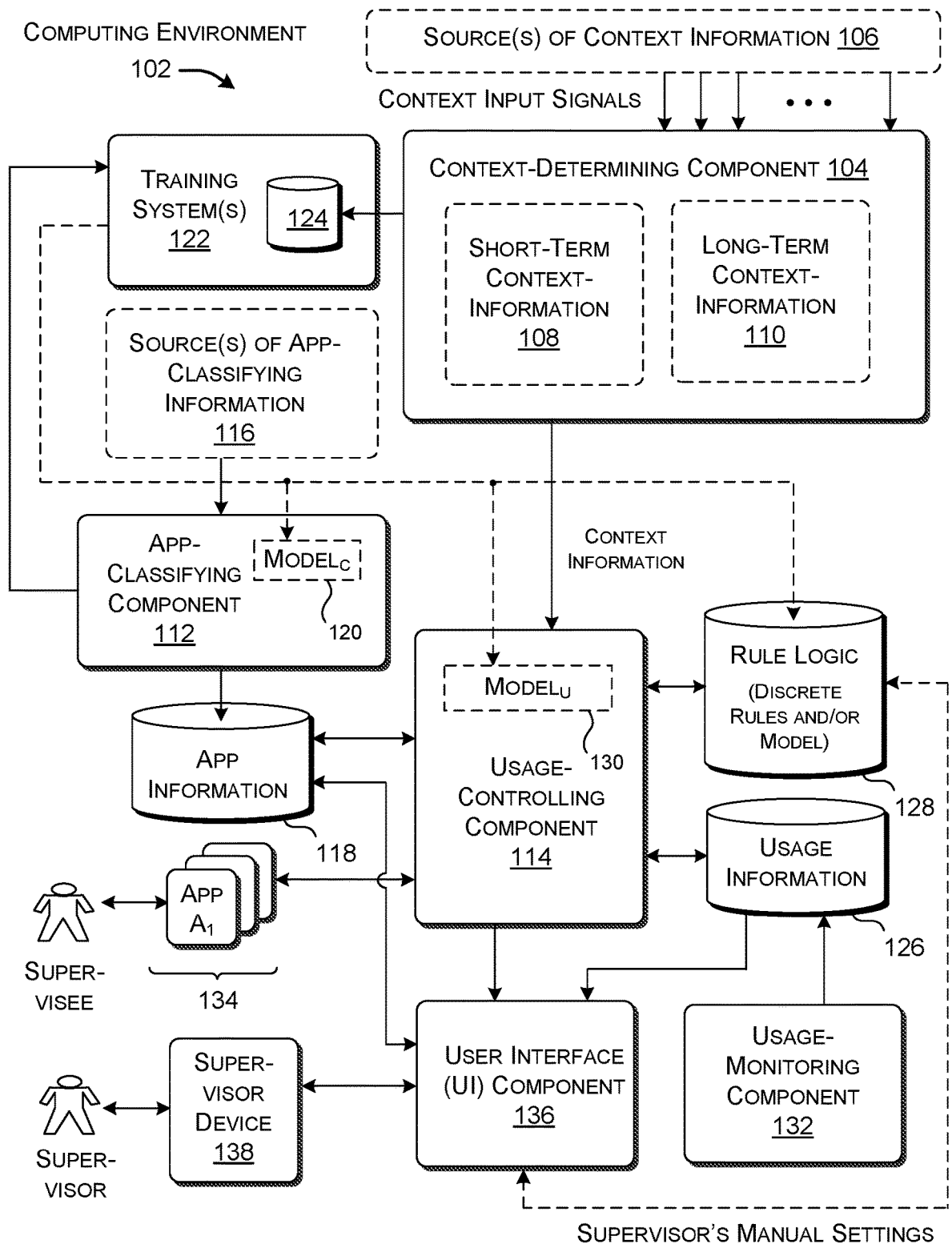
FIG. 1 shows an illustrative computing environment for managing interaction by a supervisee (e.g., a child) with applications.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes a computing environment for managing interaction by a supervisee (e.g., a child) with plural applications in plural contexts. Section B sets forth illustrative methods that explain the operation of the computing environment of Section A. And Section C describes an illustrative kind of computing device that can be used to implement any aspect of the features described in Sections A and B.

As a preliminary matter, the term "hardware logic circuitry" corresponds to a processing mechanism that includes one or more hardware processors (e.g., CPUs, GPUs, etc.) that execute machine-readable instructions stored in a memory, and/or one or more other hardware logic units (e.g., FPGAs) that perform operations using a task-specific collection of fixed and/or programmable logic gates. Section C provides additional information regarding one implementation of the hardware logic circuitry. In some contexts, each of the terms "component," "engine," and "tool" refers to a part of the hardware logic circuitry that performs a particular function.

In one case, the illustrated separation of various parts in the figures into distinct units may reflect the use of corresponding distinct physical and tangible parts in an actual implementation. Alternatively, or in addition, any single part illustrated in the figures may be implemented by plural actual physical parts. Alternatively, or in addition, the depiction of any two or more separate parts in the figures may reflect different functions performed by a single actual physical part.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). In one implementation, the blocks shown in the flowcharts that pertain to processing-related functions can be implemented by the hardware logic circuitry described in Section C, which, in turn, can be implemented by one or more hardware processors and/or other logic units that include a task-specific collection of logic gates.

As to terminology, the phrase "configured to" encompasses various physical and tangible mechanisms for performing an identified operation. The mechanisms can be configured to perform an operation using the hardware logic circuitry of Section C. The term "logic" likewise encompasses various physical and tangible mechanisms for performing a task. For instance, each processing-related operation illustrated in the flowcharts corresponds to a logic component for performing that operation. A logic component can perform its operation using the hardware logic circuitry of Section C. When implemented by computing equipment, a logic component represents an electrical element that is a physical part of the computing system, in whatever manner implemented.

Any of the storage resources described herein, or any combination of the storage resources, may be regarded as a computer-readable medium. In many cases, a computer-readable medium represents some form of physical and tangible entity. The term computer-readable medium also encompasses propagated signals, e.g., transmitted or received via a physical conduit and/or air or other wireless medium, etc. However, the specific term "computer-readable storage medium" expressly excludes propagated signals per se, while including all other forms of computer-readable media.

The following explanation may identify one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Further, the term "plurality" refers to two or more items, and does not necessarily imply "all" items of a particular kind, unless otherwise explicitly specified. Unless otherwise noted, the descriptors "first," "second," "third," etc. are used to distinguish among different items, and do not imply an ordering among items. Finally, the terms "exemplary" or "illustrative" refer to one implementation among potentially many implementations.

A. Illustrative Computing Environment

A.1. Overview

FIG. 1 shows an illustrative computing environment 102 by which a supervisor can manage a supervisee's interaction with applications. It performs this task by automatically or semi-automatically managing the amounts of time ("screen time") that the supervisee is given to interact with the applications in different contexts.

In most of the examples presented below, the supervisee corresponds to a parent and the supervisee corresponds to a child of the parent. But the principles described herein can be applied to any person or entity that is entrusted with the role of monitoring and/or controlling the application-related behaviors of another person or entity. An "application" corresponds to computer-accessible functionality and/or content with which the supervisee may interact. An application can correspond to a locally-downloaded program, a server-side program, a program having logic distributed over two or more locations, network-accessible static or dynamic content (e.g., a website), and so on, or any combination thereof.

A logical description of the computing environment 102 will first be provided below with reference to FIG. 1. An explanation of computing equipment that can implement the computing environment 102 will then be provided with reference to FIG. 2.

Starting at the top of FIG. 1, a context-determining component 104 can receive context input signals from a plurality of sources 106 of context information. Context information refers to any information that has a bearing on a current circumstance affecting the supervisee. A context input signal refers to any electronic signal that conveys context information. The context-determining component 104 can receive the context input signals using any technique or combination of techniques, including a push-based technique (in which a source independently forwards a context input signal to the context-determining component 104), a pull-based technique (in which the context-determining component 104 requests the sources 106 to provide the context input signals), and so on.

More specifically, the context-determining component 104 can collect at least two kinds of context information: short-term context information 108 and long-term context information 110. The short-term context information 108 is distinguished from the long-term context information 110 in that it is expected to change on a more frequent basis than the long-term context information. Without limitation, the short-term context information 108 can include information regarding: the current location of the supervisee; the type of establishment or site associated with the current location; the current behavior of the supervisee (e.g., whether the supervisee is moving or not); information regarding the user computing device with which the supervisee is currently interacting; the current time; the current date; the current weather; other people within a prescribed distance of the supervisee, and so on. Without limitation, long-term context information 110 can include information regarding: the current age of the supervisee; the city or town in which the supervisee resides; the school which the supervisee attends; the user computing devices to which the supervisee regularly has access, and so on.

Generally, the functionality described herein can employ various mechanisms to ensure that any user data is handled in a manner that conforms to applicable laws, social norms, and the expectations and preferences of individual users (including supervisors and supervisees). For example, the functionality can allow any user to expressly opt in to (and then expressly opt out of) the provisions of the functionality. The functionality can also provide suitable security mechanisms to ensure the privacy of the user data (such as data-anonymizing mechanisms, encryption mechanisms, password-protection mechanisms, etc.). The functionality can also provide suitable mechanisms for allowing a user to delete previously-provided data.

The sources 106 of the context signals can include a position-determining device (not shown) for determining the position of the supervisee. For example, the position-determining device can correspond to a mechanism provided by a user computing device (e.g., a smartphone) carried by the supervisee. That mechanism can determine the position of the supervisee based on triangulation of satellite and/or terrestrial signals, based on proximity of the user computing device to wireless beacon signal emitters, based on a dead-reckoning technique, etc. The context-determining component 104 can determine the type of establishment at which the supervisee is currently located based on a lookup table that maps position information to establishment type information. The sources 106 can also include a movement-determining device (not shown) for determining a type of movement-exhibited by the supervisee. For example, the movement-determining device can include an Inertial Measurement Unit (IMU) provided by a user computing device carried by the supervisee. The IMU can provide movement signals that reflect how the user computing device is moving through space, e.g., using one or more accelerometers, one or more gyroscopes, one or more magnetometers, etc., or any combination thereof.

The movement-determining device can also include analysis logic for classifying the type of motion exhibited by the movement signals. For example, the analysis logic can include a machine-trained classification model that determines the type of movement exhibited by a stream of movement signals, e.g., indicating whether the supervisee is likely walking, riding in an automobile, stationary, running, jumping, riding a bicycle, etc. The analysis logic can determine whether the user is exercising by determining whether the supervisee's movement matches patterns of movement typically exhibited by those performing exercises of different kinds. The analysis logic can determine whether the supervisee is likely riding on public transportation by determining whether the supervisee's movement corresponds to known routes and patterns of movement associated with different modes of public transportation. The machine-trained classification model used by the analysis logic can correspond to a Deep Neural Network (DNN) of any type (e.g., a Recurrent Neural Network, etc.), a Hidden Markov Model, etc.

The sources 106 can also originate from more specialized equipment that monitors the behavior of the supervisee. Without limitation, the sources 106 can include monitoring mechanisms provided by exercise equipment, automobiles, any Internet-of-Thing (IoT) smart devices within the supervisee's home or other environment visited by the supervisee, and so on.

The sources 106 can also include one or more data stores that store profile information regarding the supervisee. That profile information can include metadata that describe the supervisee's current age, city and state of residence, school, user computing devices, and so on. The profile information can be supplied by the supervisee himself/herself, or by the supervisee's supervisor. The sources 106 can also include any of: a time-keeping component for identifying the current date and current time; a calendar application that maintains information regarding scheduled activities of the supervisee; a network-accessible social network service that provides information regarding the supervisee's friends and other contacts; a network-accessible service that provides information regarding the current weather and expected future weather, and so on. These sources and associated instances of context information are described by way of example, not limitation.

As a further clarification, the above explanation set forth examples in which "context information" is defined by the current state of the user, e.g., describing what the supervisee is currently doing, where the user is currently located, and so on. In some circumstances, a supervisee's current state can also be described in terms of the series of actions that the supervisee has recently completed with respect to any temporal window of interest; these actions can be said to reside within the supervisee's current state because they inform the supervisee's current status. For example, assume that one or more monitoring devices provide context signals that indicate that the supervisee has completed various tasks within the current day, such as exercising for at least 30 minutes. In this case, the supervisee's current state will reflect that the supervisee has completed these actions. In another case, one more monitoring devices provide context signals that indicate that the supervisee has traversed a particular path to reach a current position. In this case, the supervisee's current state will reflect not only the user's current position but the trajectory that terminates in the current position, and so on.

As will be described below, in some cases, the computing environment 102 can determine the amount of screen time to be granted to a supervisee based on the historical considerations that inhere in the supervisee's current state. For example, the computing environment 102 can give the supervisee thirty more minutes of time in which to interact with a game application if it determines that the supervisee has run three miles within the current day, and/or if the supervisee has interacted with an education-related application for a prescribed amount of time in the current day, and so on.

The computing environment 102 includes at least two principal decision-making elements: an application-classifying ("app-classifying") component 112 and a usage-controlling component 114. FIG. 1 illustrates these two components as separate and distinct decision-making elements. But as will be clarified below, the computing environment 102 can alternatively provide a single decision-making component that performs the plural decision-making functions, such as the functions attributed to the app-classifying component 112 and the usage-controlling component 114.

The app-classifying component 112 assigns at least one label to an application that describes the principal functions that it performs. In some cases, the app-classifying component 112 performs this operation for a new application, meaning an application that it has never encountered before (e.g., because it is newly introduced to the marketplace). In other cases, the app-classifying component 112 performs this operation to update or confirm a prior classification given to an application.

Different environments can adopt different sets of classes in which to classify applications. Without limitation, in one such environment, the app-classifying component 112 can apply at least the following labels to applications: education, entertainment, gaming, social networking, transportation, safety, etc. An application tagged with the label "education" predominantly serves an education-related function. An application bearing the label "entertainment" provides any type of entertainment-related media content to supervisees (such as movies, videos, songs, etc.). An application having the label "gaming" serves a gaming function. An application with the label "social networking" provides a host of services commonly offered by social media sites. An application tagged with the label "transportation" provides assistance to supervisees when operating a vehicle (such as by providing directions). An application having the label "safety" provides emergency assistance to supervisees, e.g., by calling the police when requested by the supervisees, etc. These labels should be understood in the spirit of illustration, not limitation; again, other environments can classify applications in other ways. In some cases, an application serves two or more functions. In that case, the app-classifying component 112 can assign two or more different labels to the application.

In addition, or alternatively, the app-classifying component 122 can add labels to applications that describe the age-appropriateness of the applications, that is, by describing the kinds of users who can appropriately interact with the applications. These labels can also specifically identify the possibility that the applications will expose supervisees to objectionable content, such as mature content, depictions of violence, etc. The labels can also identify the risk that applications can expose supervisees to certain threats, such as the opportunity to interact with strangers, the opportunity to make purchases, the opportunity to share personal information, etc.

In one implementation, the app-classifying component 112 operates by mapping information regarding a new application (referred to herein as "app-classifying information") to least one label associated with the new application. The app-classifying information originates from one or more sources 116. The app-classifying component 112 then stores the label it applies in an app-information data store 118. More specifically, in one implementation, the app-classifying component 112 performs its classifying function based on a set of heuristic rules or algorithms. Alternatively, or in addition, the app-classifying component 112 performs its function based on a machine-trained model 120. A will be described below in greater detail in Subsection A.4, a training system 122 produces the machine-trained model 120 based on a set of training examples stored in a data store 124.

The sources 116 include the new application itself. For example, the sources 116 can include a metadata file associated with the new application, the code associated with the new application (if available for review), information revealed by static analysis of the code, information revealed by the execution of the new application, etc. Other sources 116 are external to the new application. For example, this kind of source may correspond to a marketplace site from which the supervisee downloads the new application. Another external source corresponds to a site that provides a review of the new application.

In addition, or alternatively, the sources 116 can include a data store that provides application usage information. This information, if available, describes the scenarios in which the new application has been used in the past by different users. For example, the application usage information may reveal that the new application is commonly used in school settings, which is strong evidence that the new application serves an education-related function. In addition, or alternatively, the sources 116 can include a data store that provides information that supervisors have manually supplied on one or more prior occasions. This information, if available, may reveal labels that supervisors have manually applied to the new application, and/or the constraints that the supervisors have manually applied to the new application, and so on. Still other sources of app-classifying information are possible.

The computing environment 102 can invoke the services of the app-classifying component 112 in response to different triggering events. In one case, the computing environment 102 invokes the new app-classifying component 112 when the supervisee downloads or activates a new application that has not been previously assigned a label. Alternatively, or in addition, the app-classifying component 112 can periodically revisit a prior classification of an application to ensure that the classification remains accurate in view of new evidence that has been collected. This updating behavior would be particularly effective in addressing those cases in which the manner in which an application is used evolves over time. Changes in use may subject users to new threats.

The usage-controlling component 114 performs the function of controlling a supervisee's interaction with an application, given a current context in which the supervisee seeks to interact with the application. To perform this task, the usage-controlling component 114 maps usage-controlling input information to an output result. The output result provides an indication of whether or not the supervisee is permitted to interact with the application, and, if so, the conditions under which the supervisee is permitted to interact with the application.

The usage-controlling input information includes all of the data that the usage-controlling component 114 needs to makes its decision. For example, the usage-controlling input information includes all or some of the current context information provided by the context-determining component 104. As described above, the current context information describes the current circumstance in which the supervisee seeks to interact with an application, including, but not limited to, the current location of the supervisee, the current time, the current behavior that is exhibited by the supervisee, the relevant prior behavior that leads up to and informs the supervisee's current state, and so on. The current context information also describes long-term context, such as the current age of the supervisee. The usage-controlling input information can also include any information regarding the application that the supervisee seeks to invoke, as provided by the app-information data store 118. The usage-controlling input information also includes information regarding the amount of time (if any) that the supervisee has already interacted with the application under consideration, within a specified span of time (such as within the last week). This information originates from a usage information data store 126.

In some implementations, the usage-controlling component 114 also operates based on a set of rules provided in a rules data store 128. At least some rules specify an amount of time that the supervisee is permitted to interact with the application under consideration within a specified span of time (e.g., within a week) in different respective contexts. For example, in one case, the rules data store 128 may provide a rule that specifies that the supervisee is permitted to interact with the application for four hours over the course of a week, in any context (e.g., regardless of time, place, etc.). In another case, the rules data store 128 may include a rule that specifies that the supervisee is permitted to interact with the application for four hours, but only if the supervisee is located in a particular location, and/or only if the supervisee interacts with the application within a particular span of time (e.g., within certain hours of the day). In still another case, the rules data store 128 may include a rule that grants the supervisee four hours to interact with the application; but it also includes another rule that prohibits the supervisee from interacting with the application while in a moving vehicle. In yet another case, the rules data store 128 can include plural rules that apply to supervisees having different respective age ranges. These kinds of rules are mentioned here by way of example, not limitation; the rules data store 128 can include yet more complex sets of rules that are applicable to an application under consideration.

The computing environment 102 can implement the rules in the rules data store 128 in different respective ways. In a first approach, the computing environment 102 can supply a set of predetermined handcrafted rules, e.g., as specified by any supervisor(s) and/or other entities.

In a second approach, the training system 122 provides a rule-generating component (not shown in FIG. 1) that automatically provides a set of discrete rules. For example, in a preliminary rule-generating operation, the rule-generating component can enumerate a set of prevalent scenarios by pairing each candidate application with plural contexts in which the application might be consumed. For each scenario, the rule-generating component can use a heuristic algorithm and/or machine-trained model to assign an amount of time that a supervisee is permitted to interact with the application, given the context associated with the scenario. In other words, in this case, the rule-generating component produces a parameterized set of rules, and uses a heuristic algorithm and/or machine-trained model to assign values to the variables in these rules. One merely illustrative rule may indicate that a teen between the ages of 13-17 is permitted to use any combination of social network applications for a combined total of 5 hour per week, but not while driving.

In yet a third approach, the rule-generating component generates a general-purpose machine-trained model, rather than explicitly providing a discrete set of rules (as in the second approach). The usage-controlling component 114 uses this model to map the usage-controlling input information to a screen time value. The screen time value indicates an amount of time that the supervisee is permitted to interact with the identified application within a specified span of time, if at all. In other words, in the third approach, the model corresponds to a set of weighting and bias values learned by the training system 122. The weighting and bias values implicitly capture the rules that are explicitly articulated in the second approach. Still other ways of implementing the rule logic in the data store 128 are possible.

Each approach described above has its respective potential advantages. For example, the second technique more readily allows a supervisor and supervisee to understand the limits that apply to a supervisee's consumption of applications. This, in turn, allows the supervisor to manually customize any of these rules. The third approach is potentially more general and flexible than the first and second approaches. This is because a general-purpose machine-trained model, as opposed to a set of discrete rules, may potentially account for a richer set of possibilities than is expressed by a discrete set of rules.

The usage-controlling component 114 itself operates in different ways depending on how the rules are implemented. Consider the case in which the rules data store 128 provides a discrete set of rules. The usage-controlling component 114 can operate by using the current context information as a lookup key to find the rule or rules in the rules data store 128 that applies to the current situation. The usage-controlling component 114 then applies the rule(s) to determine whether or not the supervisee is permitted to interact with the application under consideration, given the current context. For instance, assume that a supervisee who is between the ages of 13 and 17 attempts to interact with an entertainment-related application at her home. The usage-controlling component 114 can use that context information to identify one or more rules that apply to this particular context. Assume that one such identified rule indicates that the supervisee is permitted to interact with the application for four hours during a week, but not if the supervisee is currently riding in a moving vehicle. In applying this rule, the usage-controlling component 114 can first consult the information provided by the movement-determining device to determine whether the supervisee's user computing device is currently exhibiting movement indicating that the supervisee is currently riding in a vehicle. If the supervisee is not moving, the usage-controlling component 114 can check the usage information provided in the data store 126 to determine whether or not the supervisee has used up his or her allotted screen time for this application. The usage-controlling component 114 can permit the supervisee to invoke and use the application if these tests indicate that the supervisee has not used up his or her remaining time and the supervisee is not riding in a vehicle. If these conditions are not met, the usage-controlling component 114 can either prohibit the supervisee from invoking the application, or allow the supervisee to interact with the application while marking the use as non-compliant. The computing environment 102 can immediately notify the supervisor of this non-compliant use and/or simply log it for later consideration by the supervisor.

The usage-controlling component 114 can prohibit use of an application in different ways, e.g., by sending an application block instruction to an operating system component; that operating system component can act on the instruction by preventing the supervisee from launching an application. The usage-controlling component 114 can also warn a supervisee who is currently using an application that the amount of time available to the supervisee to use the application is about to expire. Once the available time reaches zero, the usage-controlling component 108 can notify the supervisee of same and shut down the application.

In another implementation, assume that the rules that govern the decisions made by the usage-controlling component 114 are encapsulated in a unified machine-learned model, rather than a discrete set of rules. Here, the usage-controlling component 114 feeds the usage-controlling input information to the model. The model provides a screen time value that indicates the amount of time that the supervisee is permitted to interact with the application. The usage-controlling component 114 can then determine whether or not to allow the supervisee to interact with the application in the same manner described above, to provide a final output result.

In some implementations, the usage-controlling component 114 can also make its decision based on additional logic, e.g., as manifested in a heuristic algorithm and/or another machine-trained model 130. For example, the additional logic can handle the situation in which the usage-controlling component 114 identifies two different discrete rules that match the current context. This might happen in different situations, as in the case in which the application under consideration has two or more labels associated with different respective functions that it performs. The additional logic can resolve this situation by generating combined constraints that represent the logical union of the two or more rules. In some cases, this may reduce to choosing the rule that places more stringent constraints on the supervisee's behavior.

Note that, altogether, FIG. 1 shows that the computing environment 102 can potentially apply at least three types of heuristic algorithms and/or machine-trained models. For example, first logic (e.g., associated with the machine-trained model 120) classifies a new application. Second logic corresponds to the rule logic in the rules data store 128. Third logic (e.g., associated with the machine-trained model 130) may assist in the decision-making performed by the usage-controlling component 114. But in another implementation, the usage-controlling component 114 can use a single machine-trained component that collapses all three functions described above.

Presuming that the supervisee is permitted to interact with an application, a usage-monitoring component 132 monitors and records the amount of time that the supervisee interacts with the application. As use continues, the usage-monitoring component 132 can also periodically decrement a remaining-time value. This value reflects the amount of time that the supervisee has left in which to interact with the application. In some cases, the usage-monitoring component 132 can manage usage information for two or more contexts in which the same application is used. For example, the usage-monitoring component 132 can record the amount of time that the supervisee interacts with the same application in two respective places, two respective times of the week, etc. The computer environment 102 may apply two respective time limits to these two contexts. In another implementation, the usage-monitoring component 132 can maintain a single log that describes the use of each application, together with metadata that describes the context associated with each use. The usage-monitoring component 132 can reconstruct the amount of time that the user has spent interacting with an application in a particular context by extracting the usage information that pertains to the context, and then aggregating the time values specified therein.

The computing environment 102 can invoke the services of the usage-controlling component 114 based on different triggering events. In one case, the computing environment 102 can invoke the usage-controlling component 114 when the supervisee attempts to activate an application, referred to herein as a candidate application. In another case, assume that the supervisee has access to a set 134 of applications, e.g., which are loaded on the supervisee's user computing device or which are otherwise accessible to the supervisee. Here, the computing environment 102 can proactively determine the subset of applications that are currently available to the supervisee for his or her use, and then notify the supervisee of the same. For example, the computing environment 102 can hide or otherwise deemphasize icons associated with the applications that are not available to the supervisee, given the current context.

The usage-controlling component 114 can also update its conclusions as the supervisee continues to interact with an application. This may be appropriate because the context that affects the supervisee may change. For example, the supervisee may move from a first location to a second location while interacting with an application. The usage-controlling component 114 can apply a first set of rules at the first location and a second set of rules at the second location. More generally, the usage-controlling component 114 can re-compute its output result in response to any change in context, including location, time of day, proximity to other people, etc.

A user interface (UI) component 136 enables the supervisor to interact with the computing environment 102 to perform various tasks. For example, the UI component 136 can provide at least one user interface (UI) presentation that allows the supervisor to modify any of the rules automatically selected by the rule-generating functionality. The UI component 136 can also provide at least one UI presentation that allows a supervisor to review a report that conveys the supervisee's consumption of applications within a prescribed span of time (e.g., within the last seven days). The supervisor can interact with the UI component 136 via user computing device 138. Subsection A.2 below provides additional information regarding illustrative user interface presentations that may be presented by the user interface component 136.

Although not shown, the computing environment 102 can include another user interface (UI) component that provides screen time management information and control options to the supervisee. For example, that UI component can alert the supervisee to the remaining available time that he or she is allotted to interact with an application.

Figure 2:
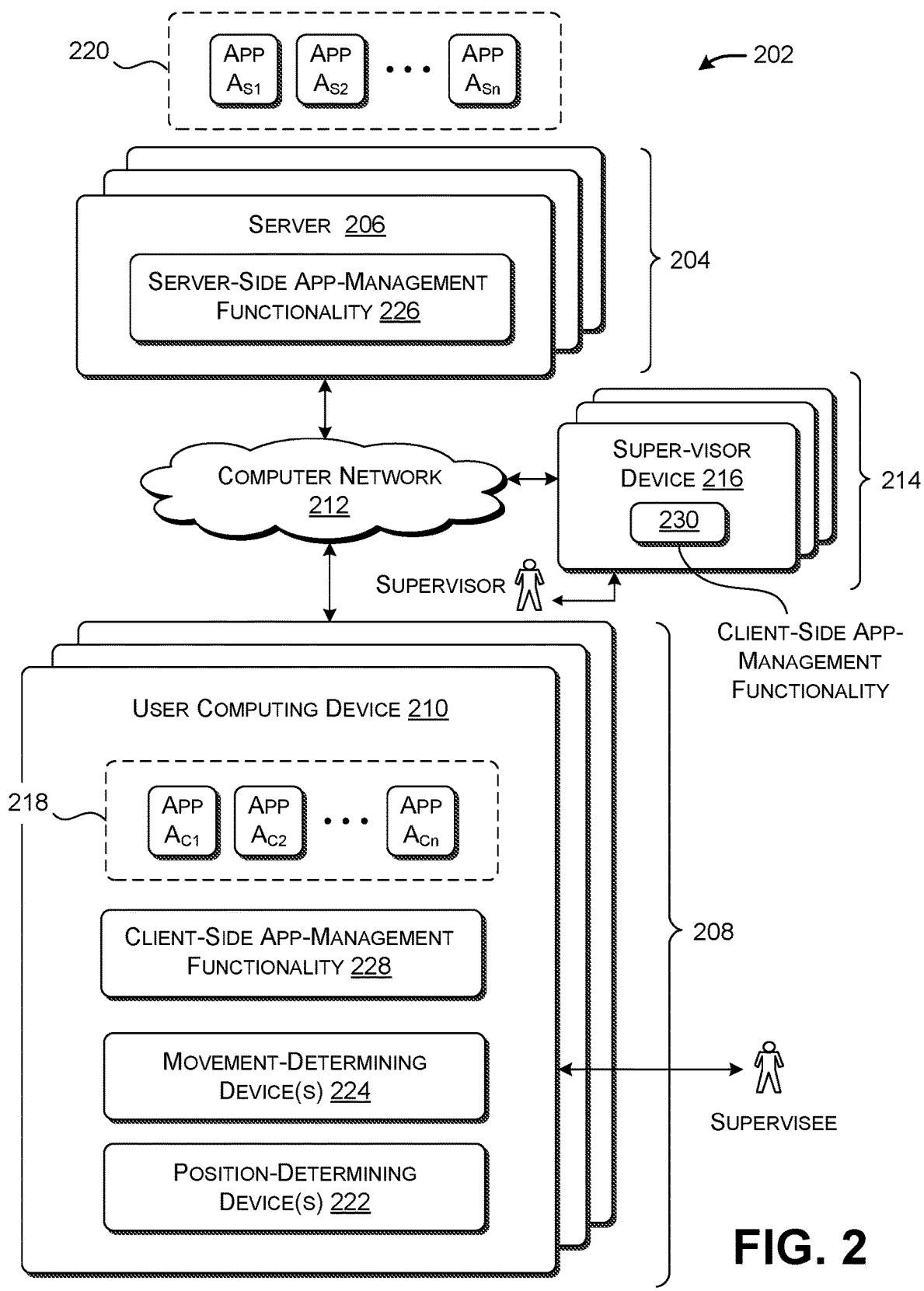
FIG. 2 shows illustrative computing equipment for implementing the computing environment of FIG. 1.

FIG. 2 shows illustrative computing equipment 202 for implementing the computing environment 102 of FIG. 1. The computing equipment 202 includes one or more servers 204 (including a representative server 206) coupled to a plurality of user computing devices 208 (including a representative user computing device 210) via a computer network 212. Assume that the supervisees use the user computing devices 208 to interact with plural applications. Assume that the supervisors may interact with the computing environment 102 using other user computing devices 214 (including representative user computing device 216), via the computer network 212. Although not shown, the computing equipment 202 can also include any number and variety of specialized devices, such as exercise equipment, smart appliances, etc.

At least some of the applications with which the supervisees interact may be locally installed on the supervisees' user computing devices 208. For instance, the representative user computing device 210 includes a collection of locally-stored applications 218. In addition, or alternatively, any of the supervisees can use their respective user computing devices 208 to interact with server-side applications, e.g., using browser functionality provided by the user computing devices 208. For instance, the one or more the servers 204 provide server-side applications 220. Still other applications provide logic that is distributed between the servers 204 and the user computing devices 208.

Any user computing device may correspond to a stationary workstation-type computing device, a laptop computing device, any type of handheld computing device (e.g., a smartphone, a tablet-type computing device, etc.), a wearable computing device, a mixed-reality computing device, an Internet-of-Thing (IoT) device, and so on, or any combination thereof. The computer network 212 can correspond to a local area network, a wide area network (e.g., the Internet), etc., or any combination thereof.

Each user computing device may include mechanisms that contribute to the context information. For example, the representative user computing device 210 operated by a supervisee includes a position-determining device 222 that determines the current location of the user computing device 210. For example, the position-determining device 222 may correspond to a Global Position System device, cell tower signal triangulation device, beacon signal detecting device, etc. The representative user computing device 210 also includes a movement-determining device 224 for determining the kind of movement exhibited by the user computing device 10. As set forth above, the movement-determining device 224 may include one or more accelerometers, one or more gyroscopes, one or more magnetometers, etc. The movement-determining device 224 can also include analysis logic for classifying movement signals provided by the movement-determining device 224, and optionally based on signals provided by the position-determining device 222.

Although not shown, each user computing device can also include other context-sensing devices. For example, the representative user computing device 210 can include a Near Field Communication (NFC) mechanism that senses a beacon signal emitted by another user computing device. Based on identity information in the beacon signal, the NFC mechanism can determine that a particular person is within a prescribed distance of the supervisee who uses the representative user computing device 210.

The above-described components of the computing environment 102 can be distributed among the devices shown in FIG. 2 in various ways. FIG. 2 makes this point by showing that the representative server 206 can include any server-side application-management functionality 226, the representative supervisee user computing device 210 can include any client-side application-management functionality 228, and the representative supervisor user computing device 216 can likewise include any client-side application-management functionality 230.

In one implementation, for example, each supervisee user computing device can implement the context-determining component 104, the app-classifying component 112, and the usage-monitoring component 132. Each supervisor user computing device implements the UI component 136. One or more servers implement the training system 122 and the associated data store 124. In this implementation, the training system 122 updates and downloads models to each supervisee user computing device.

In another implementation, any component of the computing environment 102 can be distributed between the user computing devices (208, 214) and the servers 204 in any way. For example, as will be described below, each supervisee user computing device can implement a local version of the training system 122. That local training system may personalize default models received from a server-side training system. Likewise, the information provided in the app-information data store 118, the rules data store 128, and the usage information data store 126 can be distributed among client-side devices and server-side devices in any manner.

A.2. Illustrative User Interface Experience

This subsection describes illustrative user interface (UI) presentations that the user interface (UI) component 136 may present to a supervisor (e.g., a parent) or any other authorized user or entity. These UI presentations are presented in the spirit of illustration, not limitation. Other implementations of the UI component 136 can produce UI presentations that vary from the UI presentations described in this subsection in terms of the information presented in the UI presentations, the organization of that information, and/or the control features by which the supervisor may interact with the UI presentations, and so on. The UI component 136 may represent logic provided by each supervisor user computing device and/or by one or more server-side computing devices.

To begin with, FIG. 3 shows a UI presentation 302 that allows a supervisor to view and modify rules provided in the rules data store 128. In one case, these rules correspond to discrete rules produced by the rule-generating component, e.g., produced by enumerating different rules and then supplying values for variables expressed by those rules. In another case, the rules correspond to examples produced by a general-purpose machine-trained model (produced by the rule-generating component). That is, in this case, the UI component 136 produces the rules by mapping different instances of input information describing different respective contexts to output information (e.g. screen time values) using a machine-trained model.

The UI presentation 302 optionally includes a section 304 that identifies the supervisee. Here, assume that the supervisee is a teen between the ages of 13 and 17. The UI presentation 302 includes another section 306 that describes a set of rules that govern the supervisee's consumption of different applications. More specifically, the UI presentation 302 includes a tabbed control feature 308 that allows the supervisor to select a filter factor. In response, the UI component 136 presents information regarding the rules from a perspective or pivot point defined by the selected filter factor.

In the case of FIG. 3, the supervisor has activated a "By App" filter factor. In response, the UI component 136 presents a list of applications in a leftmost column 310. For example, the UI component 136 can list all of the applications identified in the app-information data store 118. In another implementation, the UI component 136 lists a subset of applications identified in the app-information data store 118, such as only those applications that the supervisee has downloaded to his or her user computing device, and/or any application that the supervisor has previously approved for use by the supervisee. The UI component 136 can rank these applications based on any factor or combination of factors. For example, the UI component 136 can rank these applications by the frequency with which the supervisee has accessed these applications on prior occasions, or by alphabetical order, or by category, and so on.

The UI component 136 can annotate any information item in the UI presentation 302 with an indicator (here, an asterisk "*") to indicate that this information item has been automatically chosen by the computing environment 102. For example, consider a first row 312 of information items in the UI presentation 302 associated with an application named "MathHelp." In a second column 314, the app-classifying component 112 has previously classified this application as education-related. In a third column 316, the rule-generating component has specified a set of constraints that apply to the supervisee's consumption of this application for different possible context conditions. A fourth column 318 provides a key for interpreting the information items in the third column 316. For example, a first constraint in this row 312 indicates that the supervisee is forbidden to use the MathHelp program while riding in a vehicle, regardless of any other contextual factor that may apply. A second constraint indicates that the supervisee can use the MathHelp program for an unlimited amount of time within a prescribed reporting period (e.g., within a week), providing that this use occurs while the supervisee is at school. A third-listed constraint indicates that the supervisee can use the MathHelp program in other locations besides her school, providing that her use does not exceed five hours within the reporting period.

Each of these information items in the row 312 is annotated with an asterisk. This indicates that some component in the computing environment 102 has automatically selected this information item. The UI component 136 allows the supervisor to change any information item in the UI presentation 302 using an UI control technique. For instance, the UI component 136 can allow the supervisor to activate an information item as presented on a touch-sensitive display screen and/or by clicking on the information item as presented on any display screen using a mouse device, etc. The UI component 135 can respond by displaying an edit control box (not shown in FIG. 3). The supervisee can enter new information within that edit control box, e.g., by choosing a new category for the application category from a pull-down list of categories, by selecting a new time limit in the third column 316, and so on. In the example of FIG. 3, assume that the supervisee has changed constraint-related information associated with information items 320 and 322; thus, these information items are no longer marked by an asterisk.

The usage-controlling component 136 can enforce the second-listed constraint by setting up a geo-fence perimeter around a geographical location associated with the supervisee's school. The usage-controlling component 136 can then determine, at each instance of time, whether the position signal obtained from the position-determining device 222 indicates that the supervisee's user computing device is currently located within the perimeter.

Note that the time limits specified in the third column 316 can dynamically change over time based on different contextual signals, and based on different assessments of those contextual signals by the rule logic. For instance, the UI presentation 302 includes a note 324 that alerts the supervisor that the supervisee has been given a half-hour more time to interact with an entertainment-related application because the context signals reveal that the supervisee has met certain exercise-related goals.

Figure 4:
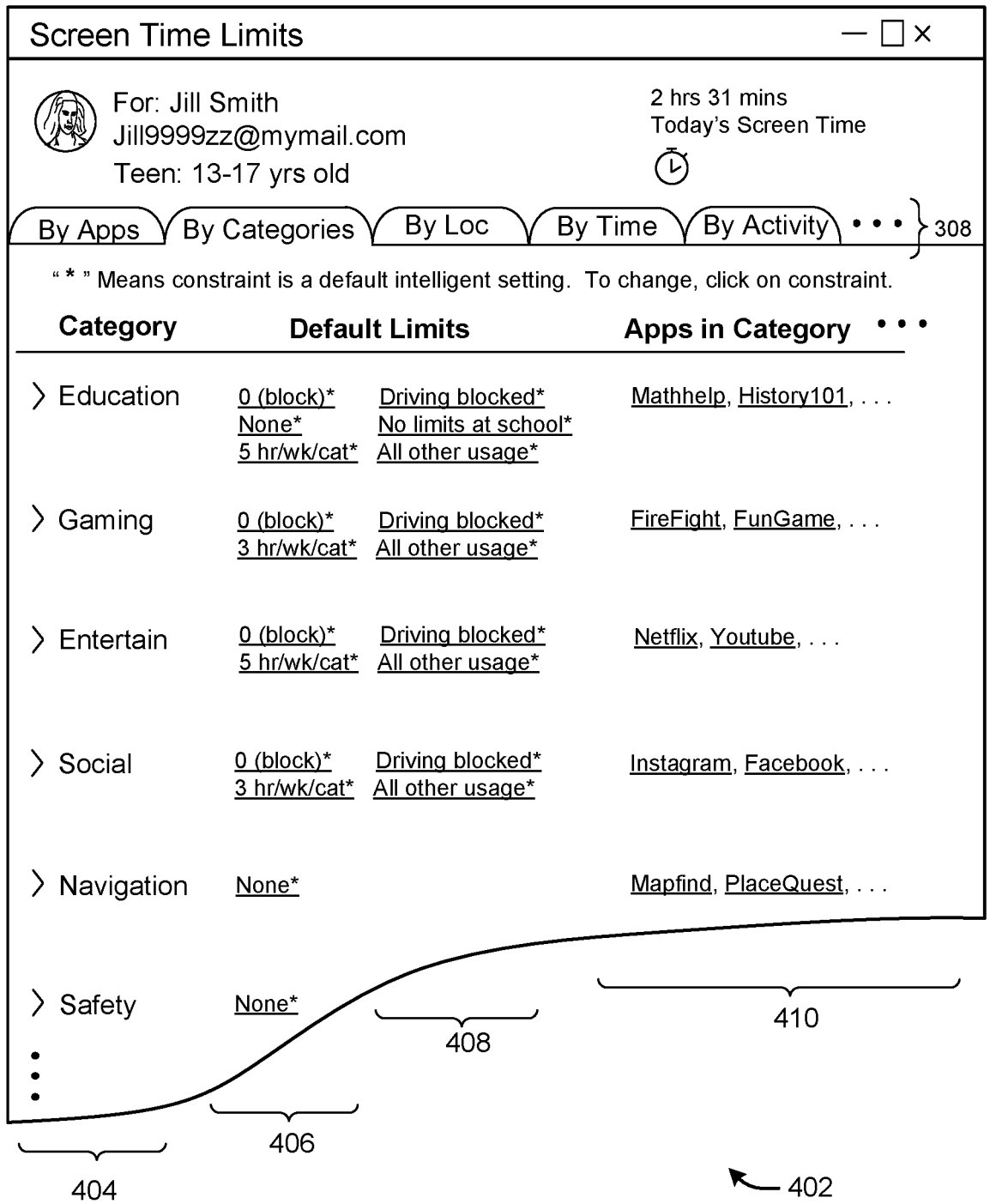

Advancing to FIG. 4, the UI component 136 displays a UI presentation 402 when the supervisee selects a "By Categories" tab in the tabbed control feature 308. In a first column 404, the UI component 136 presents a set of application categories. In a second and third columns (406, 408), the UI component 136 presents default constraints that the computing environment 102 chooses and assign to all applications in each category, unless an exception applies to one or more applications in a category. In a fourth column 410, the UI component 136 identifies the applications associated with each category. Although not shown, UI component 136 can also alert the supervisor to applications that are exceptions to the default constraints identified in the UI presentation 402. An application that is an exception to default constraints is governed by its own set of constraints; the supervisor can view those constraints via the UI presentation 302 shown in FIG. 3.

Figure 5:
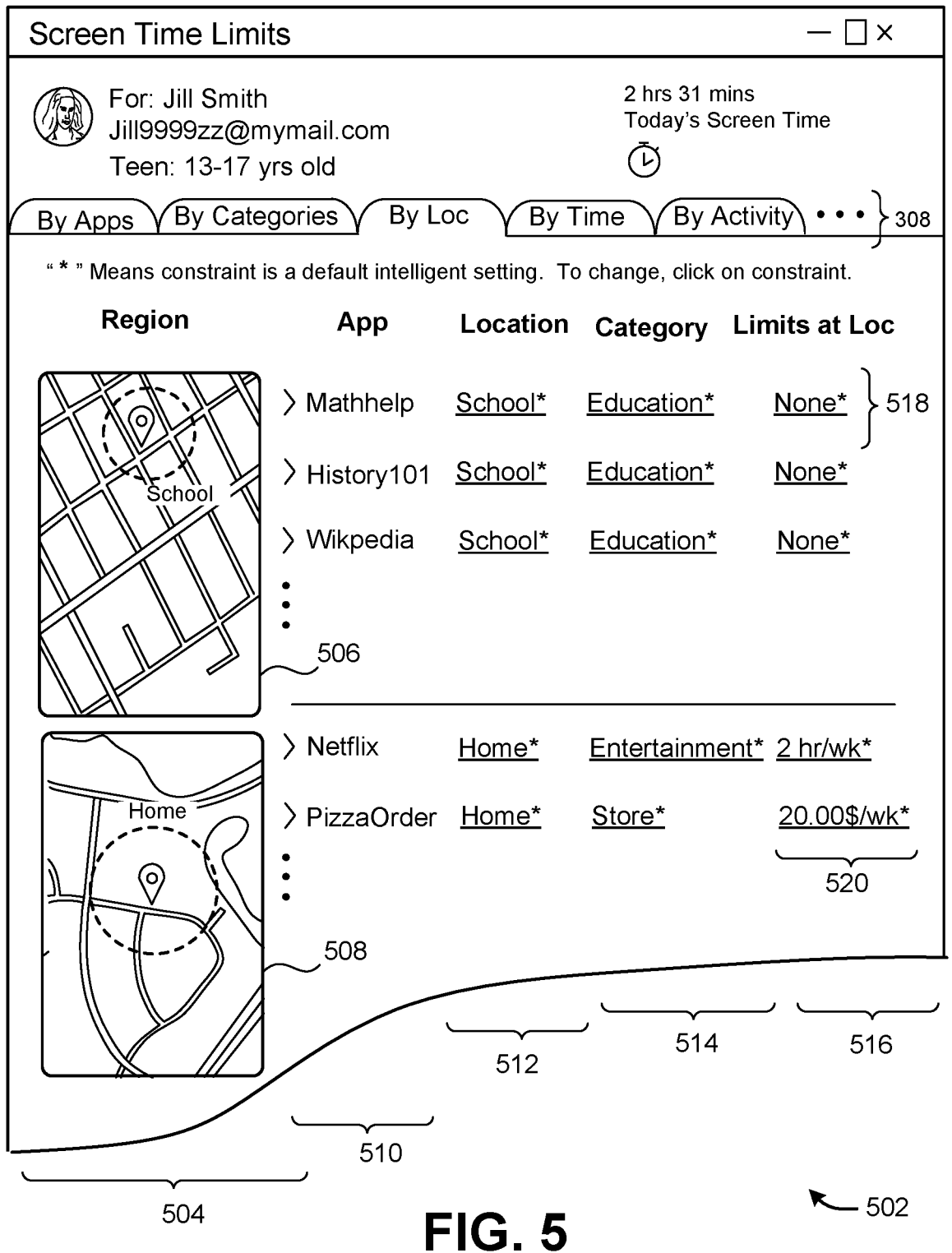

FIG. 5 shows a UI presentation 502 that the UI component 136 displays when the supervisor selects the "By Loc" tab in the tabbed control feature 308. In a first column 504, the UI component 136 presents map snippets associated with different geographical regions that play a role in the constraints applied to the applications. For example, a first map snippet 506 shows a perimeter around the supervisee's school. The supervisee is considered to be at school when the position-determining device 222 indicates that the supervisee's user computing device is within that perimeter. A second map snippet 508 shows a perimeter around the supervisee's home. The supervisee is considered to be at home when the position-determining device 222 indicates that the supervisee's user computing device is within that perimeter.

In a second column 510, the UI component 136 lists groups of applications having constraints that depend on the supervisee's presence or absence from the respective locations identified in the first column 504. In a third column 512, the UI component 136 provides the names of the locations identified in the first column 504. In a fourth column 514, the UI component 136 identifies the respective categories of the applications. And in a fifth column 516, the UI component 136 describes the constraints that apply to the respective applications, when the supervisee is at the designated locations. For example, a first row 518 in the UI presentation 502 indicates that no time limit applies to the supervisee's interaction with the MathHelp application, so long as the supervisee is located within a geographic perimeter associated with the supervisee's school. Note, however, that the UI component 136 may define other limits that apply to this program when it is consumed at other locations. That is, FIG. 5 is to be understood as providing a filtered view of the constraints that apply to the consumption of applications within particular locations.

As heretofore described, the limits that apply to an application pertain the amount of time that a supervisee is permitted to interact with the application within a specified span of time. If the permitted amount of time is zero, then the computing environment 102 effectively blocks the supervisee's interaction with the application. In addition, or alternatively, the computing environment 102 can generate and apply other constraints that apply to the supervisee's consumption of an application. Possible additional constraints may include: an amount of money that the supervisee spends via an application; an amount of messages that the supervisee sends via an application; an amount of new contacts (e.g., new "friends") that the supervisee makes via an application, and so on. For example, the computing environment 102 has defined a money-related limit for the application PizzaOrder, which indicates that the supervisee cannot make purchases via this application that exceed twenty dollars within a given report period, where such purchases are made from the supervisee's home. Information item 520 conveys this constraint.

Figure 6:
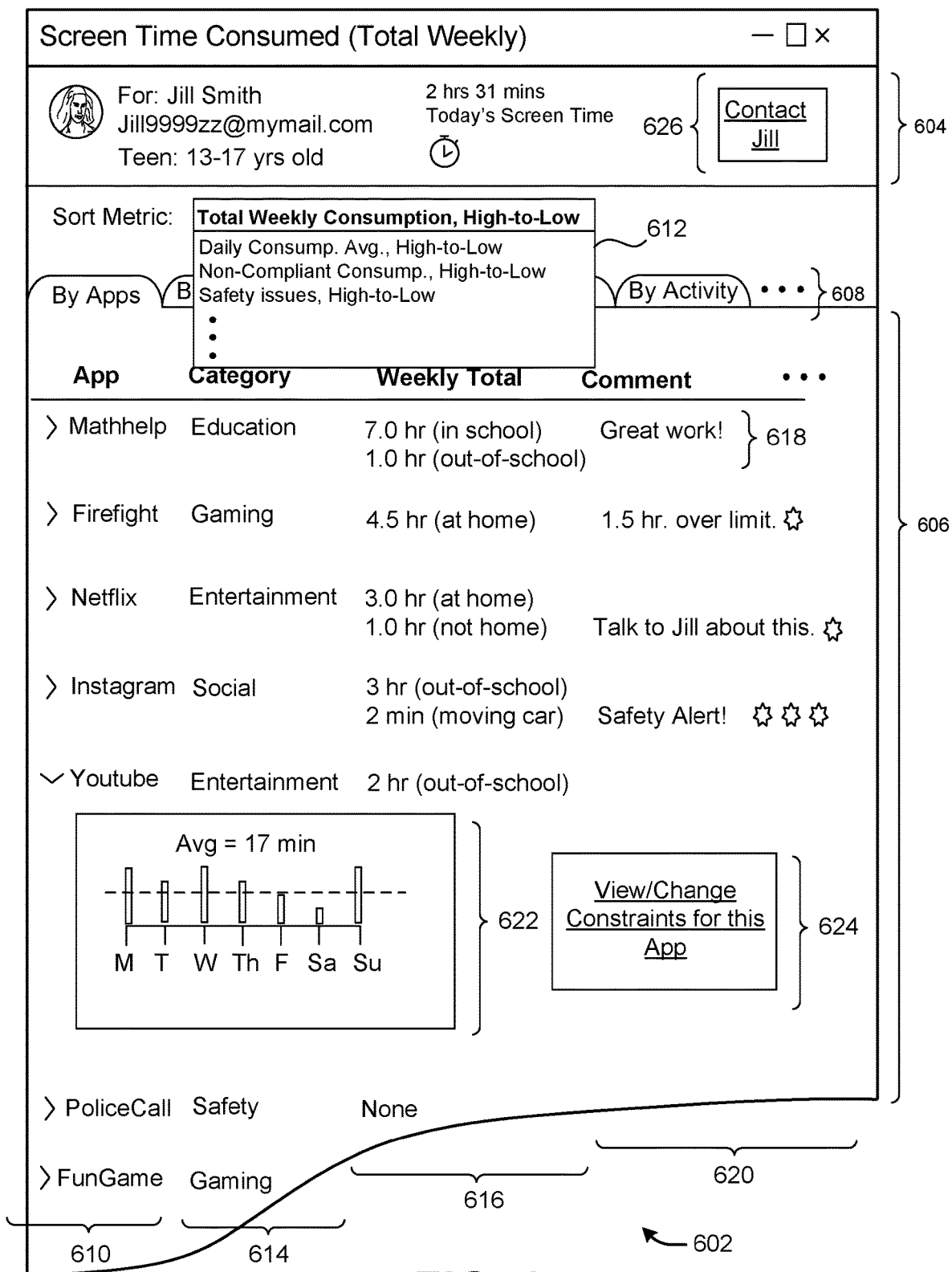
FIG. 6 shows a user interface presentation that provides an application-usage report. The report shows a supervisee's context-specific consumption of applications within a prescribed period of time, and indicates whether that consumption complies with a set of rules.

FIG. 6 shows a UI presentation 602 that the UI component 136 generates to report the supervisee's consumption of different applications within the reporting period (e.g., here, within a span of time of one week). In one merely illustrative case, the UI component 136 structures the UI presentation 602 in the same general manner as the previously-discussed UI presentations. That is, the UI presentation 602 includes a first section 604 that identifies the supervisee, and a second section 606 that provides information regarding the supervisee's consumption of applications within a reporting period. Rather than providing constraint information, however, the second section 606 in the UI presentation 602 presents information that describes the amounts of time that the supervisee has spent interacting with different applications. Although not shown, the UI component 136 can also present information regarding other metrics of consumption, such as the number of messages sent by the supervisee, the amount of money spent by the supervisee, and so on.

More specifically, the UI presentation 602 includes a tabbed control feature 608 that allows a supervisor to choose different filtering factors. Here, in FIG. 6, the supervisor has chosen the "By Apps" tab. In response, in a first column 610, the UI component 136 presents a list of applications with which the supervisee has interacted within the reporting period. A sorting control feature 612 allows the supervisor to instruct the UI component 136 to order the application in a particular way. Here, the supervisor has selected a sorting option that causes the UI component 136 to order the applications by the aggregate amounts of time that the applications were used in the reporting period, from greatest to least. That is, the UI component 136 displays the application with which the supervisee interacted with for most amount of time at the top of the list, the application with which the supervisee interacted with for the next-greatest amount of time as the second entry in the list, and so on.

In a second column 614, the UI component 136 shows the categories associated with the applications in the first column 610. In a third column 616, the UI component 136 shows the amounts of time that the supervisee has spent interacting with the applications in the first column 610. More specifically, note that the UI component 136 can show different entries for different respective contexts in which the supervisee consumed each application. For instance, consider the MathHelp program identified in the first row 618 of the UI presentation 602. Assume that the rule(s) that apply to this program convey that the supervisee is free to interact with this program for an unlimited amount of time, providing that the supervisee interacts with this program at school. But the rule(s) may also limit the supervisee's interaction with the program for all locations outside the perimeter associated with the supervisee's school. The UI component 136 accordingly reports the supervisee's consumption with the same granularity, e.g., by indicating that the supervisee has spent seven hours interacting with the program at school, and one hour interacting with the program outside of school. In another implementation, the UI component 136 can cluster the usage information in the data store 128 by location and/or any other contextual factor(s). It can then devote entries in the UI presentation 602 to the most prevalent clusters. Although not shown, the UI component 136 can also provide an entry for each application that shows the total amount of time that the supervisee spent interacting with the application across all contexts.

A fifth column 620 shows comments that help the supervisor interpret the usage information presented in the fourth column 616. For instance, the UI component 136 can display a note when the supervisee's consumption is praiseworthy (as in the supervisee's consumption of the MathHelp program) and a note when the supervisee's consumption is unsatisfactory (as in the supervisee's consumption of the Instagram program while moving in a vehicle). The UI component 136 can generate each message using a separate set of rules, e.g., by using a lookup table to map input information pertaining to the supervisee's consumption of an application to an appropriate message; the input information indicates the application under consideration, the relevant context, the limits which apply to this situation, and the amount of time that the supervisee has used the application within the reporting period.

The UI component 136 can provide different tools that allow the supervisor to interact with the information presented in the UI presentation 602. As a first tool, the UI component 136 can allow a supervisor to click on or otherwise activate an entry in the UI presentation 602, e.g., by activating the entry associated with the YouTube application. In response, the UI component 136 can present additional information 622 that shows a breakdown of the supervisee's consumption of the application over the reporting period (here, a week). The UI component 136 can also present a command feature 624 that allows a supervisor to view and/or edit the limits that apply to this application.

In addition, the UI component 136 provides a command feature 626 that allows the supervisor to contact the supervisee, e.g., to offer praise for satisfactory application-consumption behavior and negative criticism for unsatisfactory application-consumption behavior. In response to the supervisor's activation of the command feature 626, the computing environment 102 can contact the supervisee by opening a chat session of any type, by sending an email message, by making a phone call, and so on.

The UI component 136 can present other UI presentations for reviewing usage information that parallel the kinds of UI presentations shown in FIGS. 4 and 5, etc. For example, the UI component 136 can present a map to the supervisor that shows the prevalent locations at which the supervisee consumed applications. The UI component 136 can annotate the map with usage information, particularly highlighting non-compliant usage. In addition, or alternatively, the UI component 136 can present a listing of locations and usage information associated therewith. The UI component 136 can also provide various control features that allow the supervisor to interact with the map. For example, the UI component 136 can allow a user to select a region within the map (e.g., by drawing the perimeter of the region). In response, the UI component 136 can show the supervisee's consumption of applications within that region, highlight non-compliant usage.

Figure 7:
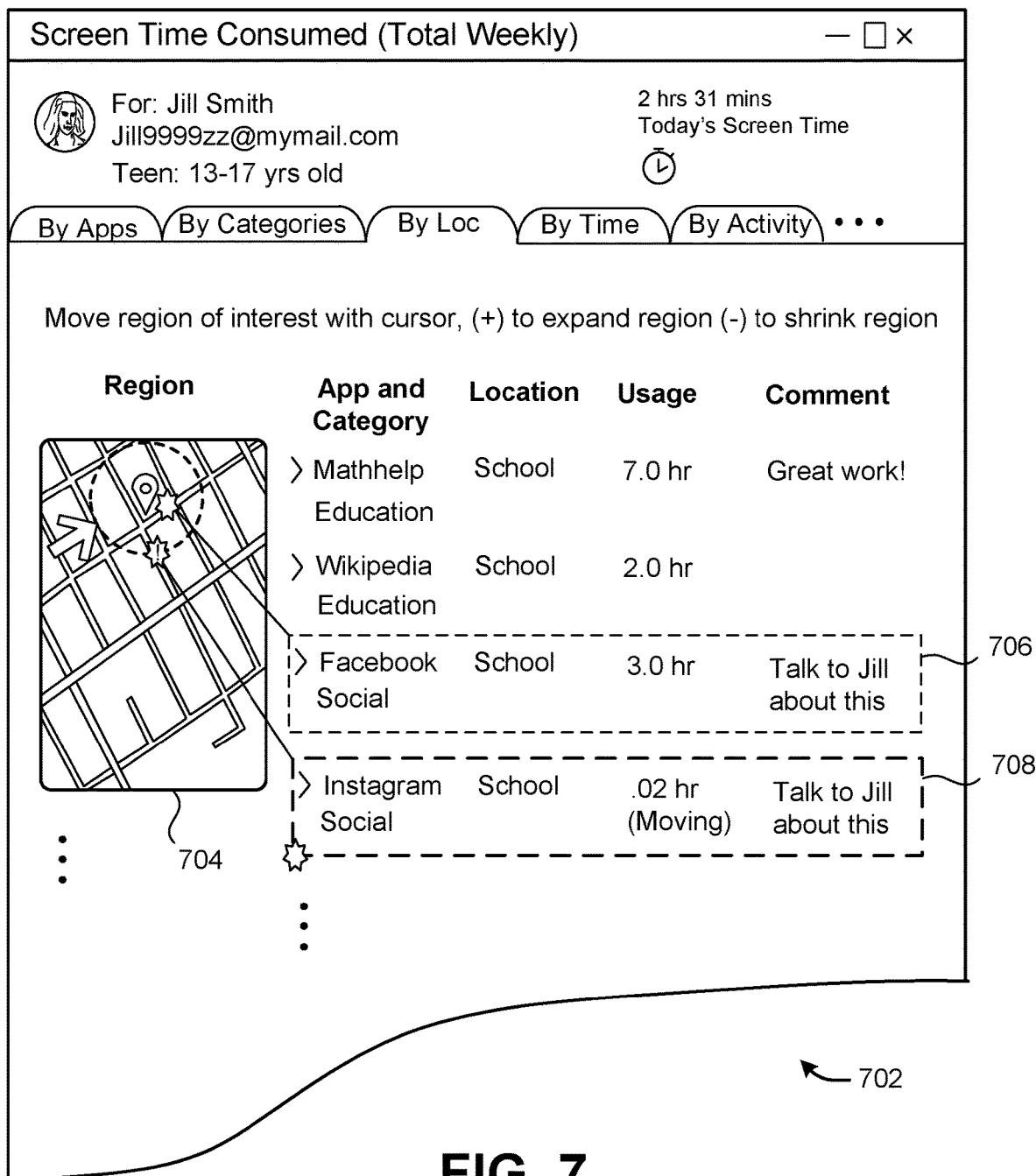
FIG. 7 shows a user interface presentation that provides a map-based application-usage report.

For example, FIG. 7 shows a UI presentation 702 that summarizes the supervisee's consumption of applications at school. A map snippet shows 704 shows a perimeter associated with the supervisee's school. The UI presentation 702 may provide control features that allow the supervisor to move the perimeter, change its size, change its shape, etc. The UI presentation 702 also provides usage information that describes the amounts of time that the supervisee has spent consuming different applications at school. The usage information highlights two instances (706, 708) that do not comply with the rules.

Figure 8:
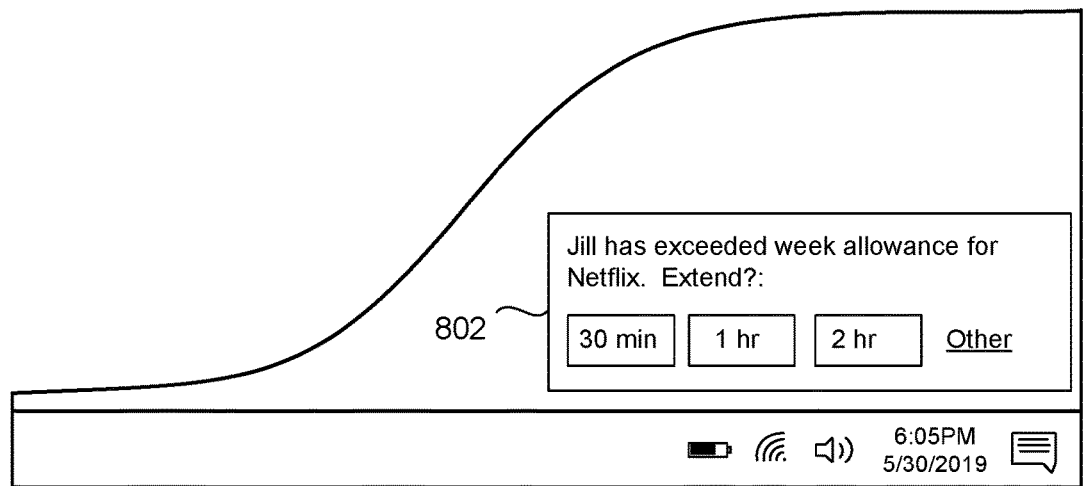
FIGS. 8 and 9 show two notifications that alert a supervisor (e.g., a parent) to non-compliant use by a supervisee of an application.
Figure 9:
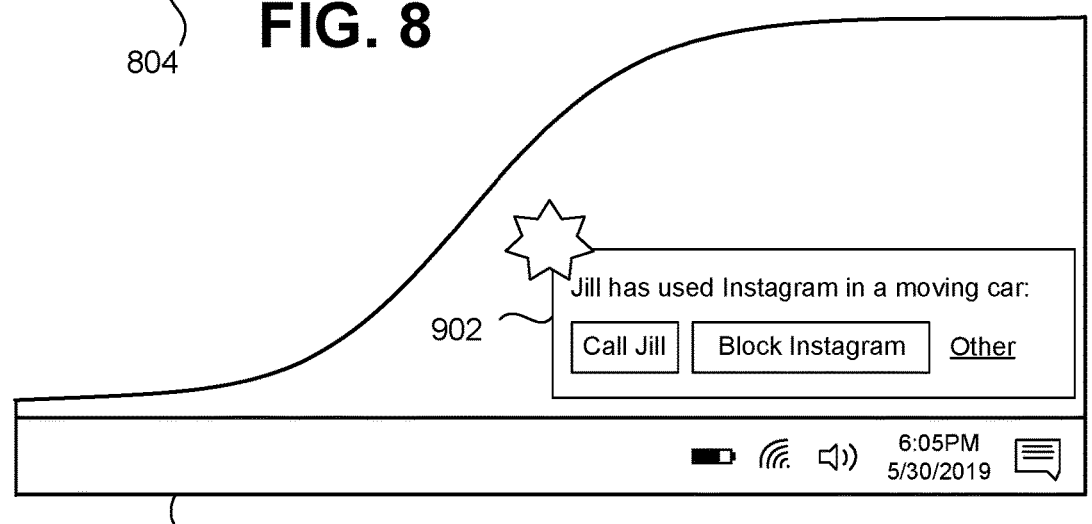

FIGS. 8 and 9 show examples of more targeted ways that the UI component 136 can alert the supervisor of unsatisfactory (or satisfactory) behavior by the supervisee, and then to allow the supervisor to immediately respond to this behavior. More specifically, in FIG. 8, the UI component 136 presents a real-time notification 802 within a UI presentation 804 provided by the user computing device 138 used by the supervisor. This notification 802 alerts the parent to the fact that her child has just exceeded an amount of time allotted for interaction with the Netflix program within the reporting period. The notification 802 also gives the supervisor various options for extending the limit. In response to the supervisor's activation of one of these options, the computing environment 102 can increase the time limit for this program by the requested amount. Although not shown, the notification 802 may allow the supervisor to respond in other ways, e.g., by blocking access to the application, contacting the supervisee, and so on.

FIG. 9 shows a case in which the UI component 136 presents a notification 802 within a UI presentation 904 that alerts the supervisee to a potentially more worrisome threat (compared to the example of FIG. 8). That is, the notification 902 indicates that the supervisee has recently (and may be currently) interacting with the Instagram application in a moving vehicle. This poses a danger to the supervisee if she happens to be driving. But the reported use may be acceptable if the supervisee is not the person operating the vehicle. The notification 902 also provides various options for responding to the alert message, e.g., by blocking access to the application, calling the supervisee, and so on.

Although not shown, a user interface (UI) component can present one or more UI presentations to the supervisee. For example, these UI presentations can alert the supervisee to the time limits that apply to his or her consumption of applications in different contexts, the remaining available time in which to interact with the applications in different contexts, etc. The UI presentations can also provide control features that allow the supervisee to interact with his or her supervisor, e.g., to request more time, dispute a limit, etc. The UI presentations can also offer guidance to the supervisee as to how he or she may increase screen time for a particular application. For example, the UI component can consult the rule logic to determine that the supervisee can earn another 20 minutes of time with which to interact with a gaming application if he or she performs certain tasks, such as exercising for a prescribed amount of time, interacting with an education-related program for a prescribed amount of time, and so on.

This subsection also generally serves to highlight how the computing environment 102 facilitates the task of assigning constraints to applications. That is, the computing environment 102 can automatically generate rules that apply to applications in different contexts, eliminating or reducing the need for the supervisor to manually perform this task. This capability is particularly useful in handling the introduction of new applications to the marketplace. The computing environment 102 can also automatically modify existing rules based on changes in the supervisee's environment. At the same time, the computing environment 102 still gives the supervisor an opportunity to customize the rules that have been automatically generated.

Figure 10:
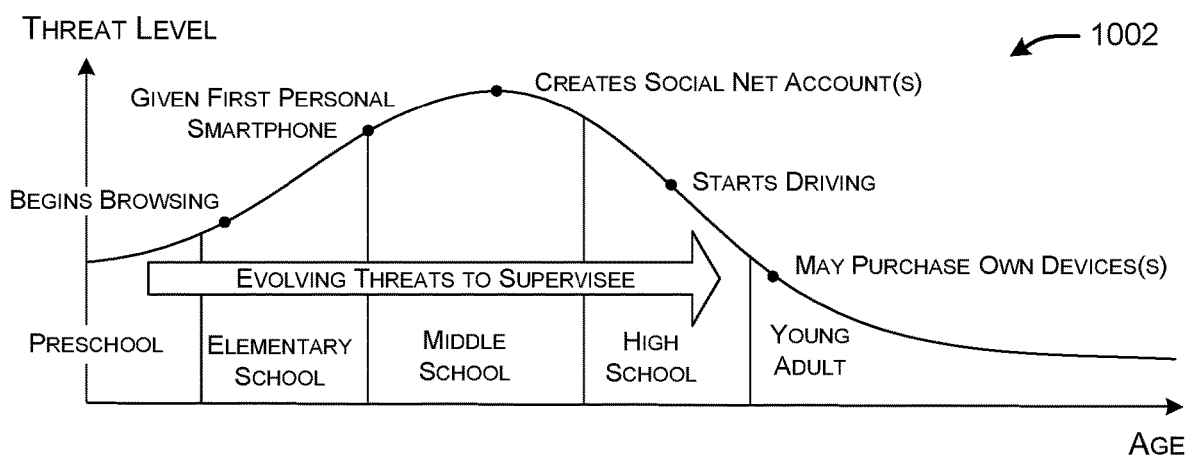
FIG. 10 is a graph that demonstrates how the threats facing a supervisee (e.g., a child) may evolve as the supervisee grows older.

Most of the examples presented so far pertain to short-term changes in context. But the computing environment 102 also effectively adapts to more profound long-term changes in context. To expand on the above points, consider FIG. 10, which shows a graph 1002 that demarcates different periods of time in a child's development, including a pre-school period, an elementary school period, a high-school period, and a post-high-school period. The graph 1002 also shows representative milestones in the child's development that have a bearing on the manner in which the child interacts with applications and other computing resources. For example, in the preschool period, the child is likely to have only limited access to specialized computing devices and applications that are authorized by the child's parents. In the elementary school period, the child may still have restricted access to computing devices and applications. For instance, the child may still rely on the computing devices of others to access a restricted set of applications. But the child's improving literacy enables him or her to interact with a browser to perform web searches and access web sites. In the middle school period, a parent may provide a child with his or her own user computing device (e.g., a smartphone), but may still closely monitor and constrain the child's use of that device. In this period, the child may also set up one or more accounts with social networking applications. In the high school period, the child may begin driving a car. At some point, the child may also begin earning an income, giving him or her some autonomy to purchase his or her own devices. These events in the development of a child are presented here merely in the spirit of illustration, not limitation. The above-described information-technology-related milestones in a child's development can be expected to differ depending the child's culture, the child's place of residence (and associated community), the parent's child-rearing philosophy, etc.

The threats facing the child can likewise be expected to vary throughout the child's development. For example, a child in middle school may begin interacting with social network applications, but may not have yet developed sufficient judgment skills to ward off contacts with unknown and potentially inappropriate individuals. A child who begins driving in high school may be at heighted risk of interacting with her smartphone while driving.

As a general goal, the computing environment 102 described above addresses these evolving threats by automatically and dynamically varying the rules that it applies to a child as the child grows older. The computing environment 102 specifically accounts for the introduction of new computing devices and applications in a child's life. It also accounts for changes in the child's patterns of conduct as they grow older, and the child's evolving ability to make sound judgments. The computing environment 102 achieves these results by providing rule logic that expresses the knowledge shown in the graph 1002.

A.3. The App-Classifying Component and the Usage-Controlling Component

Figures 11, 12:
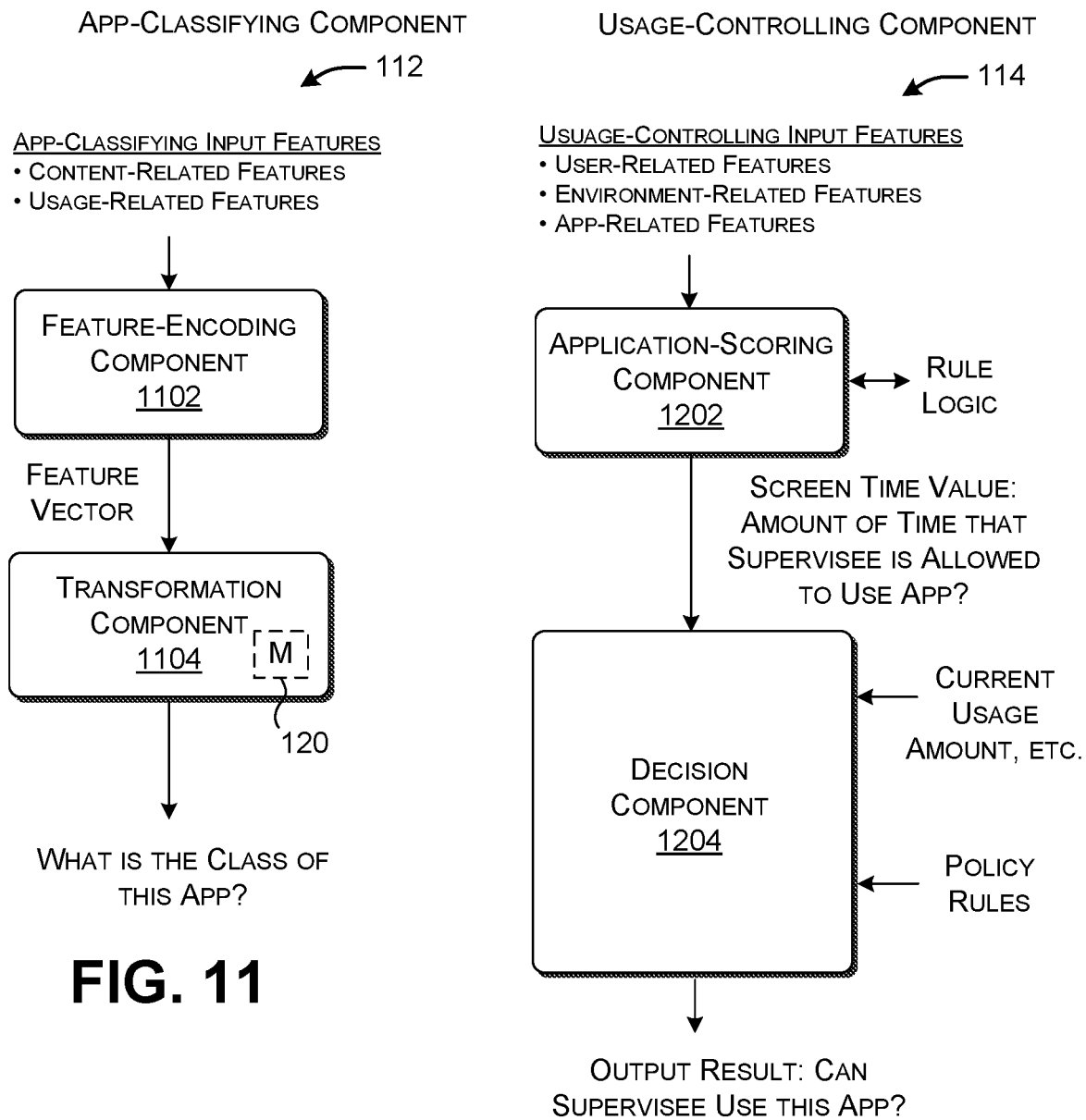
FIG. 11 shows one implementation of an application-classifying component, which is another element of the computing environment of FIG. 1.
FIG. 12 shows one implementation of a usage-controlling component, which is another element of the computing environment of FIG. 1.

FIG. 11 shows one implementation of the app-classifying component 112, which was introduced in the above explanation of FIG. 1. To repeat, the function of the app-classifying component 112 is to assign at least one label to an application that identifies the principal function(s) performed by the application, and/or other characteristics of the application (such as its age-appropriateness etc.). The computing environment 102 may invoke the app-classifying component 112 when a new application is introduced to the marketplace, or when it is appropriate to revisit a prior classification given to a known application (e.g., which can be performed on an event-driven basis, a periodic basis, etc.).

The implementation of the app-classifying component shown in FIG. 11 uses a machine-trained model 120. The model 120 can be implemented as any type of machine-trained logic, such as a Support Vector Machine (SVM) model, a decision tree model, a logistic regression model, a neural network model of any type(s) (such as a fully-connected feed-forward network, a Convolutional Neural Network, etc.), and so on.

More specifically, a feature-encoding component 1102 first receives a collection of app-classifying input features that describe an application under consideration. Without limitation, the features can include: information regarding how the application is described in one or more sources that are external to the application itself; information provided by the application itself (e.g., in a metadata file associated with the application); information regarding how the application has been used by others (if this information is available), and so on. The feature-encoding component 1102 then converts these features into a format that can be processed by the machine-trained model 120. For example, the feature-encoding component 1102 can consult a lookup table to convert different information items into discrete values or input vectors. In the case of linguistic information (such as keywords, etc.), the feature-encoding component 1102 can convert each linguistic item (e.g., each word) into a one-hot vector (with a 1 entry in a dimension of the vector associated with the word, and 0 entries in other dimensions). Or it can convert the linguistic item into a vector that encodes n-gram information (having 1 entries for n-grams that are present in the input word, and 0 entries for other dimensions).

A transformation component 1104 can then uses the model 120 to map the input features into a final output result. For example, the transformation component 1104 can map the input features into a numeric output result. It can then consult a lookup table or other mapping mechanism to convert the numeric output result to a particular label.

Alternatively, or in addition, the app-classifying component 112 can use one or more heuristic rules to classify an application. One such rule can state that an application with a description having one or more telltale keywords is to be given a particular label. For example, an application having a description in which the word "algebra" appears is to be labeled as an education-related application. Another rule may indicate that an application that is associated with usage information that indicates that is commonly used in school-related settings is to be labeled as an education-related application, and so on. Such a rule can use any environment-specific threshold value to determine when a pattern is considered statistically significant.

FIG. 12 shows one implementation of the usage-controlling component 114. This component 114 maps a set of usage-controlling input features into an output result. The output result indicates whether or not a supervisee is permitted to interact an identified application. More specifically, the usage-controlling input features include information regarding the supervisee (such as the supervisee's age, place of residence, school, etc.), information regarding the candidate application with which the supervisee seeks to interact (such as the classification of the application, etc.), and information regarding the current environment in which the supervisee is currently operating (such as the current time, the current place in which the supervisee seeks to interact with the candidate application, etc.). As described above, the input features can also encompass information that reveals the actions that the supervisee has recently completed, which can be said to inhere within the current context. An application-scoring component 1202 assigns a screen time value to the application that reflects whether or not the application is appropriate for this supervisee to use in the present context. In some implementations, the screen time value can more specifically describe an amount of time that the supervisee is permitted to interact with the application within a specified span of time, given the present context. A value of zero indicates that that the supervisee should not use the application at all, given the current context. In some cases, the screen time is non-zero and primarily depends on what a supervisee having a particular age is current doing, and/or where the supervisee is currently located, and/or with whom the supervisee is currently associated, etc. In addition, or alternatively, the screen time is non-zero and depends on the tasks that the supervisee has recently completed.

A decision component 1204 can makes a final decision as to whether or not the supervisee should be allowed to interact with the application, to provide a final output result. For example, the decision component 1204 can consult usage information in the data store 126 (of FIG. 1) to determine the amount of time that the supervisee has already spent interacting with the application. If this amount of time is less than the amount of allocated screen time specified by the application-scoring component, then the decision component 1204 can indicate that interaction with the application is permitted. The decision component 1204 can revisit its decision throughout the supervisee's interaction with the application. With continued interaction, the decision component 1204 will eventually reach that juncture at which the supervisee has no more time remaining in which to interact with the application.

The decision component 1204 can consult one or more policy rules to determine how it acts on its conclusions as to whether a relevant time limit is exceeded or not. In accordance with one rule, the decision component 1204 can prohibit the supervisee from interacting with the application when the time limit has been exceeded (or is zero to begin with). In another case, the decision component 1204 can allow the supervisee to interact with the application in this circumstance, but it will flag this use as non-compliant.

The application-scoring component 1202 uses rule logic in the data store 128 (of FIG. 1) to generate the screen time value. As described above, the rule logic can take different forms in different respective implementations. In a first case, the rule logic corresponds to a discrete set of rules. Each rule is associated with a particular contextual situation, e.g., involving the consumption of a particular application by a particular kind of supervisee, at a particular time and/or at a particular place. In one non-limiting implementation, such a rule identifies the amount of time that the supervisee is permitted to interact with the application (if at all) in a given reporting period. Here, the application-scoring component 1202 operates by matching the set of usage-controlling input features to at least one rule that is associated with the same features. It then outputs the time limit associated with that rule.

In a second implementation, the rule logic may correspond to a machine-trained model, rather than a discrete set of rules. Here, the application-scoring component 1202 can use the same kind of architecture shown in FIG. 11 to perform its operation. That is, the application-scoring component 1202 can use a feature-encoding component to convert its input features into a form for further processing. It can then use a transformation component to map the input features into an output result. In one case, the output result specifies an amount of time that the supervisee is permitted to interact with the given application, given the current specified context.

Although not represented in FIG. 12, in some implementations, the usage-controlling component 114 can also make its decision based on additional logic, e.g., as manifested in a heuristic algorithm and/or another machine-trained model 130. For example, the additional logic can handle the situation in which the usage-controlling component 114 identifies two different discrete rules that match the current context. The additional logic can determine what rule applies to this situation, or whether a union of the plural rules applies to this situation. Alternatively, this additional logic can be incorporated in the rule logic itself.

Figure 13:
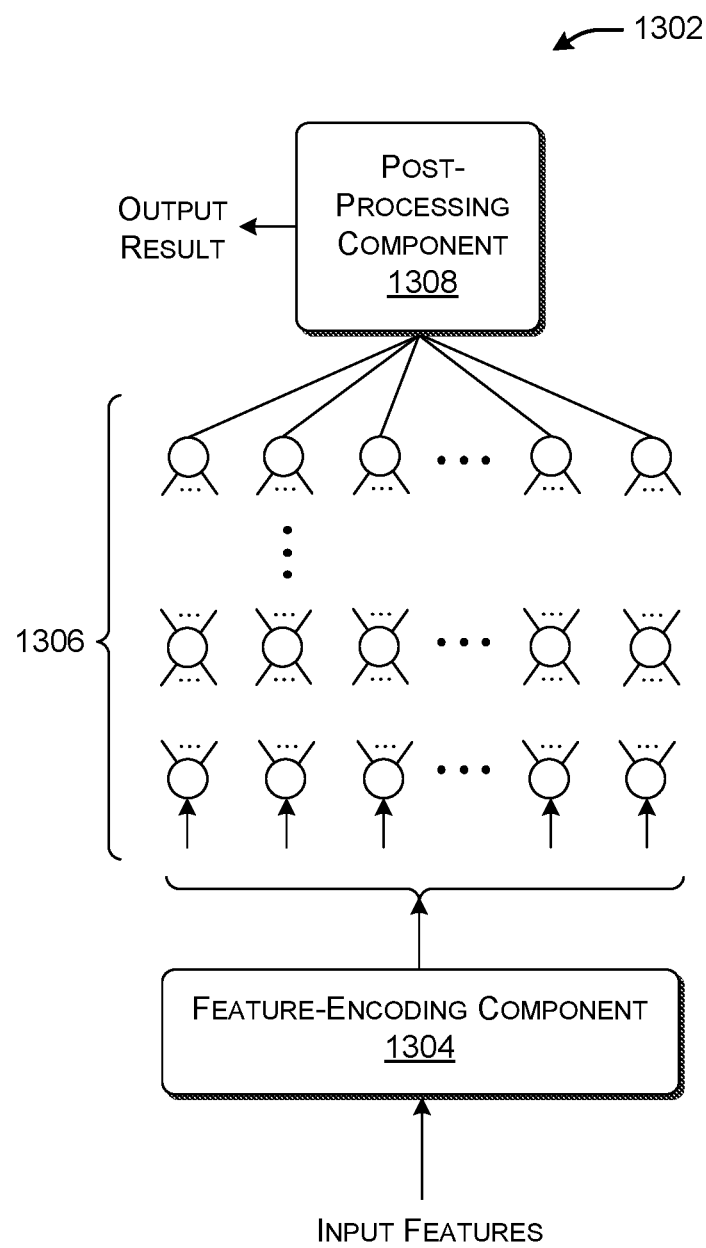
FIG. 13 shows neural network functionality, which can be used to implement aspects of one or more components of the computing environment of FIG. 1.

FIG. 13 shows functionality 1302 generally summarizes how a machine-trained model can map input information to output information. Here, a feature-encoding component 1304 converts input features into an appropriate form for further processing, e.g., by converting the features into collection of input vectors. A neural network component 1306 uses any type of neural network to convert the input vectors into a collection output vectors provided by a last layer of neurons. The neural network may include one or more layers of neurons. The values in any layer j of a feed-forward network may be given by the formula, $z_j = f(W_j z_{j-1} + b_j)$, for $j=2, \ldots N$. The symbol $W_j$ denotes a j-th machine-learned weight matrix, and the symbol $b_j$ refers to an optional j-th machine-learned bias vector. The activation function $f(x)$ can be formulated in different ways, such as the tan h function, or the rectified linear (ReLU) function, etc. A post-processing component 1308 converts the output values provided by the last layer into a final output result. For example, the post-processing component 1308 can correspond to a softmax function.

A.4. Illustrative Training Functionality

Figure 14:
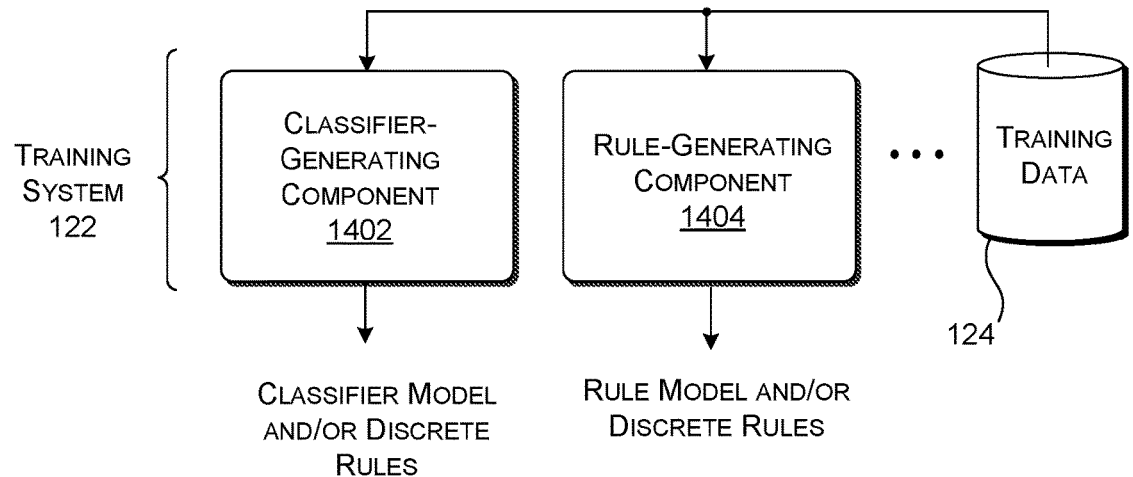
FIG. 14 shows an overview of a training system provided by the computing environment of FIG. 1.

FIG. 14 shows an overview of the training system 122 provided by the computing environment 102 of FIG. 1. The training system 122 includes a classifier-generating component 1402 for generating logic that governs the operation of the app-classifying component 112. For example, the classifier-generating component 1402 can include machine-learning functionality that generates the machine-trained model 120 used by the app-classifying component 112.

The classifier-generating component 1402 can generate the model 120 based on a set of training examples in the training data store 124. Each positive training example can correspond to information about an application (including its associated metadata and other properties, its description by external sources, the manner in which it has been used by others, etc.), together with an appropriate label associated with the application. Each negative training example can correspond to incorrect pairing of application information and a label associated with the application. The classifier-generating component 1402 can iteratively adjust the weighting values and bias values associated with the model 120 to progressively increase the probability that the model 120 will assign the correct label to an application, and decrease the probability that the model 120 will assign an incorrect label to an application. The classifier-generating component 1402 can perform this operation using any training technique, such as Stochastic Gradient Descent, the known ADAM algorithm, and so on. Alternatively, or in addition, the classifier-generating component 1402 supplies the kind of heuristic rules described above.

The training system 122 also includes a rule-generating component 1404 for generating the above-described rule logic stored in the data store 128. In a first case, the rule logic includes a parameterized set of discrete set of rules. In this implementation, the rule-generating component 1404 chooses the rules and defines values for the variables in the rules. In a second approach, the rule logic includes a machine-trained model. In that case, the rule-generating component 1404 produces that model.

More specifically, with respect to the first case, the rule-generating component 1404 can begin by enumerating a plurality of discrete scenarios associated with respective rules. For example, the rule-generating component 1404 can define a group of rules that contemplates the use of a given application in various prevalent contexts in which the application is expected to be used. For instance, a first context may indicate use of the application at home, a second context may correspond to use of the application at school, a third context may correspond to use of the application in any other location, a fourth context may contemplate the use of the application while the supervisee is in a moving vehicle, and so on. The rule-generating component 1404 can also expand this grouping to different age brackets and/or other salient characteristics regarding supervisees who are expected to interact with the application. Different environments can perform this enumeration with any level of granularity based on environment-specific heuristic rules.

After this enumeration operation, the rule-generating component 1404 can assign one or more values to each rule. In some cases, a value may specify the amount of time that the supervisee is permitted to interact with the application, given the contextual scenario associated with the rule. For example, consider a rule that pertains to the scenario which a supervisee in the age-range of 13-17 interacts with a particular application at home. The rule-generating component 1404 can use a machine-trained model and/or one or more heuristic rules to assign a value to this rule, indicating the amount of time that a supervisee in this range of ages is permitted to use the application in the specified context.

The model that is used to compute this time limit value can correspond to any kind of machine-trained functionality, such as a logistic regression model, a neural network of any type, and so on. The rule-generating component 1404 can train this kind of model using a set of training examples in the data store 124. Each positive training example can correspond to information regarding a scenario, paired with an appropriate time limit for that scenario. Each negative training example can correspond to a description of a scenario together with an inappropriate time limit associated with this scenario. The rule-generating component 1404 can iteratively train this model by increasing the probability that it will assign a correct time limit to a scenario, and decrease the probability that it will assign an incorrect time limit to a scenario. The rule-generating component 1404 can perform this task using any training technique, such as the techniques mentioned above. In one case, these training examples can be harvested from a data store that identifies manual time limit decisions made by supervisors.

Alternatively, or in addition, the rule-generating component 1404 can use one or more heuristic rules to assign a time limit value to a scenario. For example, the rule-generating component 1404 can adopt a rule that indicates that no child should be permitted to use an application in a moving car, unless that application has been labeled as navigation-related application.

In the second implementation mentioned above, the rule-generating component 1404 develops a machine-trained model for computing the time-limit, that is, without first generating a discrete set of rules. In this context, the general-purpose model includes a set of weighting values and bias values that implicitly embody a set of rules, without the need for explicitly enumerating those rules. Here, the rule-generating component 1404 can produce such a model based on a set of training examples in the training data store 124 in generally the same manner described above for the first-mentioned case.

The two implementations described above can be viewed as differing in terms of the stage at which they use machine-learning to compute a time limit for a scenario. The first implementation (that uses discrete rules) uses a machine-trained model in the offline rule-creation stage to define the time limits associated with different prevalent scenarios. The second implementation uses a machine-trained model in the real-time application stage to compute a time limit for an identified current context. The first implementation may be desirable to help a supervisor (and supervisee) better understand the constraints that apply to the consumption of applications. It also provides a paradigm that makes it easy for supervisors to modify rules. It may also make efficient use of resources in the real-time application phase. The second implementation may offer greater generality at runtime compared to the first implementation.

As described above, note that the second implementation (that uses a machine-trained model in the runtime phase) can also populate a set of rules for the supervisor's viewing via the types of UI presentations shown in FIGS. 3-5. The computing environment 102 can perform this task by feeding different instances of input information associated with different prevalent input scenarios into the machine-trained model, and then displaying the different instances of input information together with the output results produced by the machine-trained model. The computing environment 102 can take account for the supervisor's modification to the rules by retraining the machine-trained model or by carving out and storing discrete exceptions to rule logic embodied in the machine-trained model.

Figure 15:
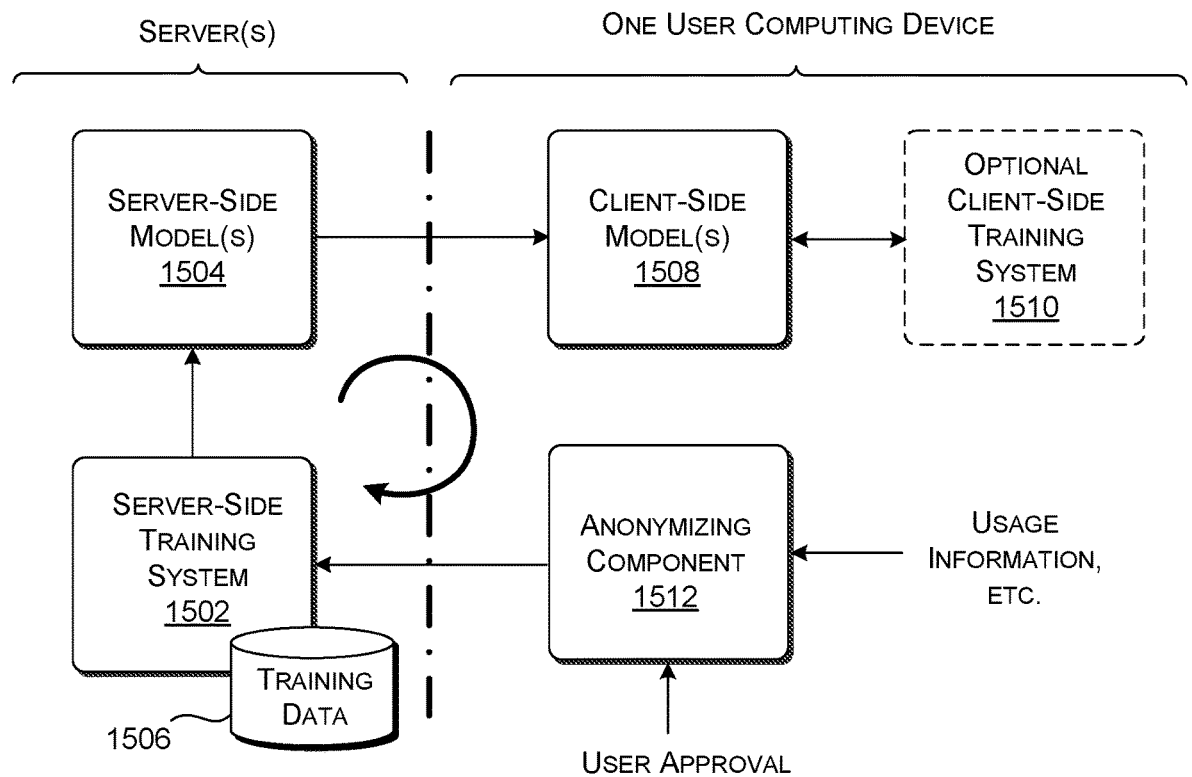
FIG. 15 shows an illustrative architecture for distributing training tasks between client-side and server-side training functionality.

FIG. 15 demonstrates how aspects of the training system 122 can optionally be distributed across the user computing devices 208 and the servers 204 (of FIG. 2). In this implementation, a server-side training system 1502 generates one or more machine-trained models 1504 of the types described above based on training data provided in a data store 1506. For example, the models 1504 can include the model 120 used by the app-classifying component 112 and/or a model for use by the usage-controlling component 114 (where that model implements the rule logic in the data store 128). The server-side training system 1502 can then distribute these models 1504 to the respective user computing devices 208 used by the supervisees. Once installed on the respective user computing devices 208, the server-side models 1504 can thereafter be considered as client-side models.

FIG. 15 specifically shows a set of client-side models 1508 provided by one particular user computing device operated by one particular supervisee. That user computing device uses its set of client-side models 1508 to make local decisions, e.g., by assigning a label to a newly downloaded application, by determining whether it is appropriate to use an application in a given context, etc.

Optionally, each user computing device can also include a local training system 1510. The local training system 1510 can personalize the client-side models 1508 based on the behavior of the supervisee who uses the models 1508. For example, assume that this supervisee regularly requests permission from his or her parent to use a particular application in a school setting, and that the parent regularly approves this requested use. The local training system 1510 can adjust the weighting and bias values in the rule logic to increase the probability that this application will be automatically approved when the supervisee next attempts to access this application at school. Or the local training system 1510 can define and save discrete exceptions to the rule logic associated with the client-side models 1508.

The user computing device can also include an anonymizing component 1512 for sending data to the server-side training system 1502. The data may convey the amounts of time that the supervisee has used different applications in different contextual situations. The data can also report those occasions on which a supervisor modified rule logic provided by the client-side models 1508, and so on. The anonymizing component 1512 can first establish permission to send the data to the sever-side training system 1502, which can be provided by the supervisor and/or the supervisee. If permission is given, the anonymizing component 1512 can remove information in the data that associates the data with a particular person having a particular identity. For example, the anonymizing component 1512 can alter the data such that it generally reflects a pattern of conduct by a supervisee within a particular range of ages, living in a particular region of the country, without otherwise providing an information that ties the pattern to a particular person.

Upon receipt of data from plural user computing devices, the server-side training system 1502 uses the data to update the server-side models 1504. More specifically, in one implementation, the sever-side training system 1502 can update the server-side models 1504 on a periodic basis and/or an event-driven basis. After each update, the server-side training system 1502 distributes the updated models to the user computing devices 208. This manner of operation will ensure that each local computing device has the most current version of the models.

B. Illustrative Processes

FIGS. 16 and 17 show processes that explain the operation of the computing environment 102 of Section A in flowchart form. Since the principles underlying the operation of the computing environment 102 have already been described in Section A, certain operations will be addressed in summary fashion in this section. As noted in the prefatory part of the Detailed Description, each flowchart is expressed as a series of operations performed in a particular order. But the order of these operations is merely representative, and can be varied in any manner.

More specifically, FIG. 16 shows a process 1602 that represents an overview of one manner of operation of the computing environment 102 of FIG. 1. In block 1604, the computing environment 102 uses a machine-trained model 120 and/or heuristic logic to automatically classify plural applications, to provide plural classified applications. In block 1606, the computing environment 102 automatically controls access by a particular supervisee to a classified application based on a current context affecting the supervisee, and based on rule logic provided by a training system 122. In block 1608, the computing environment 102 generates a report that describes an amount of time that the supervisee has interacted with at least one classified application in different respective contexts.

FIG. 17 shows a process 1702 that provides further details regarding the controlling operation associated with block 1606 of FIG. 16. In block 1704, the computing environment 102 automatically receives rule logic. For instance, the rule logic may be received from the server-side training system 1502, which uses a rule-generating component to automatically generate it. The rule logic specifies amounts of time allocated to different kinds or classes of supervisees for interaction with plural applications in plural contexts. In block 1706, the computing environment 102 receives an application input signal that identifies a candidate application, e.g., in response to the particular supervisee attempting to invoke the candidate application. In block 1708, the computing environment 102 receives context input signals from one or more input devices. The context input signals collectively provide current context information that describes a current context affecting the supervisee. At least one context input signal identifies a classification associated with the candidate application. In block 1710, the computing environment 102 generates an output result based on the current context information and the rule logic. The output result specifies an amount of time that the supervisee is permitted to interact with the candidate application in the current context. In block 1712, the computing environment 102 controls interaction by the supervisee with the candidate application based on the output result.

C. Representative Computing Device

Figure 18:
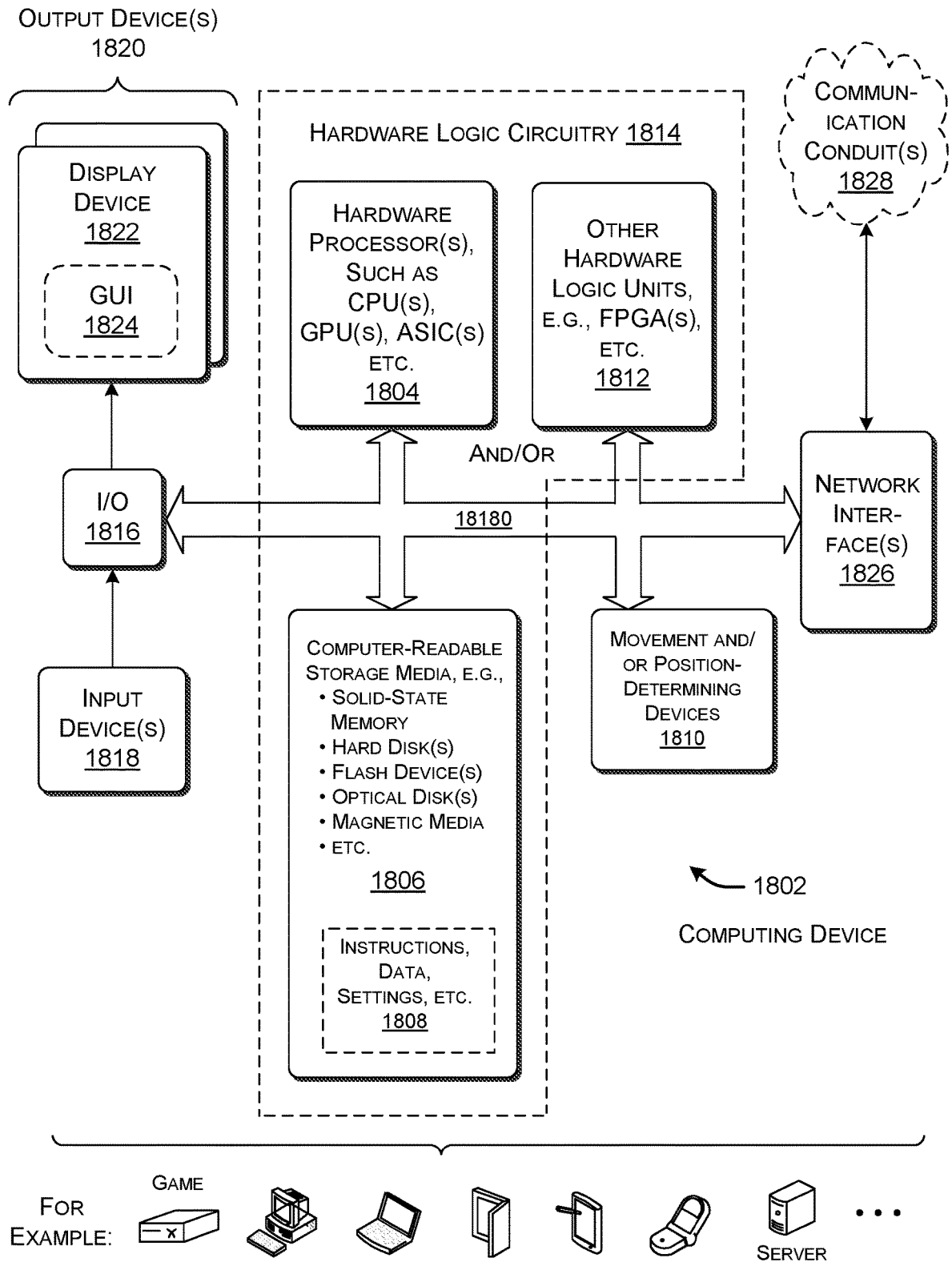
FIG. 18 shows an illustrative type of computing device that can be used to implement any aspect of the features shown in the foregoing drawings.

FIG. 18 shows a computing device 1802 that can be used to implement any aspect of the mechanisms set forth in the above-described figures. For instance, with reference to FIG. 2, the type of computing device 1802 shown in FIG. 18 can be used to implement any server, any user computing device, etc. In all cases, the computing device 1802 represents a physical and tangible processing mechanism.

The computing device 1802 can include one or more hardware processors 1804. The hardware processor(s) 1804 can include, without limitation, one or more Central Processing Units (CPUs), and/or one or more Graphics Processing Units (GPUs), and/or one or more Application Specific Integrated Circuits (ASICs), etc. More generally, any hardware processor can correspond to a general-purpose processing unit or an application-specific processor unit.

The computing device 1802 can also include computer-readable storage media 1806, corresponding to one or more computer-readable media hardware units. The computer-readable storage media 1806 retains any kind of information 1808, such as machine-readable instructions, settings, data, etc. Without limitation, for instance, the computer-readable storage media 1806 may include one or more solid-state devices, one or more magnetic hard disks, one or more optical disks, magnetic tape, and so on. Any instance of the computer-readable storage media 1806 can use any technology for storing and retrieving information. Further, any instance of the computer-readable storage media 1806 may represent a fixed or removable unit of the computing device 1802. Further, any instance of the computer-readable storage media 1806 may provide volatile or non-volatile retention of information.

The computing device 1802 can utilize any instance of the computer-readable storage media 1806 in different ways. For example, any instance of the computer-readable storage media 1806 may represent a hardware memory unit (such as Random Access Memory (RAM)) for storing transient information during execution of a program by the computing device 1802, and/or a hardware storage unit (such as a hard disk) for retaining/archiving information on a more permanent basis. In the latter case, the computing device 1802 also includes one or more drive mechanisms (not shown, such as a hard drive mechanism) for storing and retrieving information from an instance of the computer-readable storage media 1806. As already described, the computing device 1802 can include any context-sensing devices, such as one or more movement and/or position-determining devices 1810.

The computing device 1802 may perform any of the functions described above when the hardware processor(s) 1804 carry out computer-readable instructions stored in any instance of the computer-readable storage media 1806. For instance, the computing device 1802 may carry out computer-readable instructions to perform each block of the processes described in Section B.

Alternatively, or in addition, the computing device 1802 may rely on one or more other hardware logic units 1812 to perform operations using a task-specific collection of logic gates. For instance, the hardware logic unit(s) 1812 may include a fixed configuration of hardware logic gates, e.g., that are created and set at the time of manufacture, and thereafter unalterable. Alternatively, or in addition, the other hardware logic unit(s) 1812 may include a collection of programmable hardware logic gates that can be set to perform different application-specific tasks. The latter category of devices includes, but is not limited to Programmable Array Logic Devices (PALs), Generic Array Logic Devices (GALs), Complex Programmable Logic Devices (CPLDs), Field-Programmable Gate Arrays (FPGAs), etc.

FIG. 18 generally indicates that hardware logic circuitry 1814 includes any combination of the hardware processor(s) 1804, the computer-readable storage media 1806, and/or the other hardware logic unit(s) 1812. That is, the computing device 1802 can employ any combination of the hardware processor(s) 1804 that execute machine-readable instructions provided in the computer-readable storage media 1806, and/or one or more other hardware logic unit(s) 1812 that perform operations using a fixed and/or programmable collection of hardware logic gates. More generally stated, the hardware logic circuitry 1814 corresponds to one or more hardware logic units of any type(s) that perform operations based on logic stored in and/or otherwise embodied in the hardware logic unit(s).

In some cases (e.g., in the case in which the computing device 1802 represents a user computing device), the computing device 1802 also includes an input/output interface 1816 for receiving various inputs (via input devices 1818), and for providing various outputs (via output devices 1820). Illustrative input devices include a keyboard device, a mouse input device, a touchscreen input device, a digitizing pad, one or more static image cameras, one or more video cameras, one or more depth camera systems, one or more microphones, a voice recognition mechanism, any movement detection mechanisms (e.g., accelerometers, gyroscopes, etc.), and so on. One particular output mechanism may include a display device 1822 and an associated graphical user interface presentation (GUI) 1824. The display device 1822 may correspond to a liquid crystal display device, a light-emitting diode display (LED) device, a cathode ray tube device, a projection mechanism, etc. Other output devices include a printer, one or more speakers, a haptic output mechanism, an archival mechanism (for storing output information), and so on. The computing device 1802 can also include one or more network interfaces 1826 for exchanging data with other devices via one or more communication conduits 1828. One or more communication buses 1830 communicatively couple the above-described units together.

The communication conduit(s) 1828 can be implemented in any manner, e.g., by a local area computer network, a wide area computer network (e.g., the Internet), point-to-point connections, etc., or any combination thereof. The communication conduit(s) 1828 can include any combination of hardwired links, wireless links, routers, gateway functionality, name servers, etc., governed by any protocol or combination of protocols.

FIG. 18 shows the computing device 1802 as being composed of a discrete collection of separate units. In some cases, the collection of units may correspond to discrete hardware units provided in a computing device chassis having any form factor. FIG. 18 shows illustrative form factors in its bottom portion. In other cases, the computing device 1802 can include a hardware logic unit that integrates the functions of two or more of the units shown in FIG. 1. For instance, the computing device 1802 can include a system on a chip (SoC or SOC), corresponding to an integrated circuit that combines the functions of two or more of the units shown in FIG. 18.

The following summary provides a non-exhaustive set of illustrative examples of the technology set forth herein.

According to a first example, one or more computing devices are described for controlling interaction by supervisees with applications. The device(s) include hardware logic circuitry, which, in turn includes: (a) one or more hardware processors that perform operations by executing machine-readable instructions stored in a memory, and/or (b) one or more other hardware logic units that perform the operations using a task-specific collection of logic gates. The operations include: receiving rule logic, the rule logic specifying amounts of time allocated to different kinds of supervisees for interaction with plural applications in plural contexts; receiving an application input signal that identifies a candidate application; receiving context input signals from one or more input devices, the context input signals collectively providing current context information that describes a current context affecting a particular supervisee; generating an output result based on the current context information and the rule logic, the output result specifying an amount of time that the supervisee is permitted to interact with the candidate application in the current context; and controlling interaction by the supervisee with the candidate application based on the output result.

According to a second example, at least one context input signal originates from a position-determining device and identifies a current position of the supervisee, and at least one other context input signal originates from a movement-determining device and identifies whether the supervisee is currently moving.

According to a third example, the context input signals include two sets of context input signals that describe the current context affecting the supervisee, the two sets of context input signals assessing context with respect to two different spans of time.

According to the fourth example, the rule logic corresponds to a set of discrete rules.

According to a fifth example, the rule logic corresponds to a machine-trained model that implicitly expresses a set of rules.

According to a sixth example, a given rule expressed by the rule logic specifies an amount of time that the supervisee is permitted to interact with the candidate application at a specified location.

According to a seventh example, the specified location referenced in the sixth example is a school-related setting.

According to an eighth example, a given rule expressed by the rule logic specifies an amount of time that the supervisee is permitted to interact with the candidate application at a specified time.

According to a ninth example, a given rule expressed by the rule logic specifies an amount of time that the supervisee is permitted to interact with the candidate application while engaged in a specified activity.

According to a tenth example, the specified activity referenced in the ninth example is operating a vehicle.

According to an eleventh example, a given rule expressed by the rule logic specifies an amount of time that the supervisee is permitted to interact with the candidate application based on an indication that the supervisee has completed a prescribed task.

According to a twelfth example, a given rule expressed by the rule logic depends on an age of the supervisee and on a category of application associated with the candidate application.

According to thirteenth example, the operations further include: receiving application-classifying input features pertaining to a new application under consideration; and using a machine-trained model to automatically identify a classification of the new application based on the application-classifying input features. The application-classifying input features provide: information expressed by the new application itself; and/or information obtained from one or more sources other than the new application that describe the new application; and/or information that describes how users have used the new application in different contexts.

According to a fourteenth example, the operations further include: providing a user interface presentation to a supervisor of the supervisee, the user interface presentation showing representations of plural rules expressed by the rule logic; and receiving a correction input signal from the supervisor in response to interaction by the supervisor with the user interface presentation, the correction input signal specifying a change to at least one of the plural rules.

According to a fifteenth example, the operations further include: generating a report that describes an amount of time that the supervisee has interacted with at least one application in different respective contexts; and providing the report to a supervisor of the supervisee.

According to a sixteenth example, a computer-implemented method for controlling interaction by a supervisee with applications is described. The method includes: using a machine-trained model to automatically classify plural applications, to provide plural classified applications; receiving rule logic, the rule logic specifying amounts of time allocated to different kinds of supervisees for interaction with plural applications in plural contexts, the rule logic being automatically generated by a training system; receiving an application input signal that identifies a candidate application; and receiving context input signals from one or more input devices, the context input signals collectively providing current context information that describes a current context affecting a particular supervisee. The context input signals includes: at least one context input signal that originates from a position-determining device and that identifies a current position of the supervisee; at least one other context input signal that originates from a movement-determining device and that identifies whether the supervisee is currently moving; and at least one other context input signal that originates from the machine-trained model and that identifies a classification associated with the candidate application. The method further includes: generating an output result based on the current context information and the rule logic, the output result specifying an amount of time that the supervisee is permitted to interact with the candidate application in the current context; and controlling interaction by the supervisee with the candidate application based on the output result.

According to a seventeenth example, relating to the sixteenth example, a given rule expressed by the rule logic specifies an amount of time that the supervisee is permitted to interact with the candidate application at a specified location.

According to an eighteenth example, relating to the sixteenth example, a given rule expressed by the rule logic specifies an amount of time that the supervisee is permitted to interact with the candidate application while engaged in a specified activity.

According to a nineteenth example, relating to the sixteenth example, the method further includes: generating a report that describes an amount of time that the supervisee has interacted with at least one classified application in different respective contexts; and providing the report to a supervisor of the supervisee.

According to a twentieth example, a computer-readable storage medium for storing computer-readable instructions is described. The computer-readable instructions, when executed by one or more hardware processors, perform a method that includes: using a machine-trained model to automatically classify plural applications, to provide plural classified applications; receiving rule logic, the rule logic specifying amounts of time allocated to different kinds of supervisees for interaction with plural applications in plural contexts; receiving an application input signal that identifies a candidate application; receiving context input signals from one or more input devices, the context input signals collectively providing current context information that describes a current context affecting a particular supervisee, the context input signals including at least one context input signal that originates from the machine-trained model and which identifies a classification associated with the candidate application; generating an output result based on the current context information and the rule logic, the output result specifying an amount of time that the supervisee is permitted to interact with the candidate application in the current context; controlling interaction by the supervisee with the candidate application based on the output result; and generating a report that describes an amount of time that the supervisee has interacted with at least one classified application in different respective contexts.

A twenty-first example corresponds to any combination (e.g., any logically consistent permutation or subset) of the above-referenced first through twentieth examples.

A twenty-second example corresponds to any method counterpart, device counterpart, system counterpart, means-plus-function counterpart, computer-readable storage medium counterpart, data structure counterpart, article of manufacture counterpart, graphical user interface presentation counterpart, etc. associated with the first through twenty-first examples.

In closing, the description may have set forth various concepts in the context of illustrative challenges or problems. This manner of explanation is not intended to suggest that others have appreciated and/or articulated the challenges or problems in the manner specified herein. Further, this manner of explanation is not intended to suggest that the subject matter recited in the claims is limited to solving the identified challenges or problems; that is, the subject matter in the claims may be applied in the context of challenges or problems other than those described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. One or more computing devices for controlling interaction by supervisees with applications, comprising:
   hardware logic circuitry, the hardware logic circuitry including: (a) one or more hardware processors that perform operations by executing machine-readable instructions stored in a memory, and/or (b) one or more other hardware logic units that perform the operations using a collection of configured logic gates, the operations including:
   automatically enumerating different instances of input information describing different respective contexts in which a supervisee may interact with a particular application, at least two contexts of the different respective contexts identifying different locations at which the supervisee may interact with the particular application;
   for the different instances of input information associated with the different respective contexts, using a machine-trained model to map each instance of input information of said different instances of input information, associated with a particular context, to a particular time limit value, the particular time limit value specifying an amount of time that the supervisee is permitted to interact with the particular application in the particular context, the particular time limit value being automatically generated by the machine-trained model by transforming input features that describe the particular context to the particular time limit value, said using the machine-trained model generating plural time limit values associated with the different respective contexts;
   generating a report that describes the plural time limit values generated by the machine-trained model for the particular application for the different respective contexts;
   providing the report to a supervisor of the supervisee;
   detecting a current context of the supervisee; and
   controlling interaction by the supervisee with a given application based on an identified time limit value that applies to the current context and the given application, as generated by the machine-trained model.

2. The one or more computing devices of claim 1, wherein a training system produces the machine-trained model based on a set of training examples, each positive training example specifying information regarding a particular scenario paired with a specified time limit value for the scenario.

3. The one or more computing devices of claim 1, wherein the machine-trained model determines the particular time limit value for the particular application based, in part, on a context signal provided by another machine-trained model that describes a category associated with the particular application.

4. The one or more computing devices of claim 1, wherein the report includes different user interface presentations that present information regarding the different respective contexts and associated time limit values in different respective ways.

5. The one or more computing devices of claim 1, wherein the report also shows a map on a user interface presentation that designates different regions associated with the different respective contexts that have been enumerated, and time limit values associated with the different regions generated by the machine-trained model.

6. The one or more computing devices of claim 1, wherein the report distinguishes time values that have been produced by the machine-trained model from at least one time limit value that has been manually selected by the supervisor.

7. A computer-implemented method for controlling interaction by supervisees with applications, comprising:
automatically enumerating different instances of input information describing different respective contexts in which a supervisee may interact with a particular application, at least two contexts of the different respective contexts identifying different locations at which the supervisee may interact with the particular application;
for the different instances of input information associated with the different respective contexts, using a machine-trained model to map each instance of input information of said different instances of input information, associated with a particular context, to a particular time limit value, the particular time limit value specifying an amount of time that the supervisee is permitted to interact with the particular application in the particular context, the particular time limit value being automatically generated by the machine-trained model by transforming input features that describe the particular context to the particular time limit value, said using the machine-trained model generating plural time limit values associated with the different respective contexts;
generating a report that describes the plural time limit values generated by the machine-trained model for the particular application for the different respective contexts;
providing the report to a supervisor of the supervisee;
detecting a current context of the supervisee; and
controlling interaction by the supervisee with a given application based on an identified time limit value that applies to the current context and the given application, as generated by the machine-trained model.

8. The method of claim 7, wherein a training system produces the machine-trained model based on a set of training examples, each positive training example specifying information regarding a particular scenario paired with a specified time limit value for the scenario.

9. The method of claim 7, wherein the machine-trained model determines the particular time limit value for the particular application based, in part, on a context signal provided by another machine-trained model that describes a category associated with the particular application.

10. The method of claim 7, wherein the report includes different user interface presentations that present information regarding the different respective contexts and associated time limit values in different respective ways.

11. The method of claim 7, wherein the report also shows a map on a user interface presentation that designates different regions associated with the different respective contexts that have been enumerated, and time limit values associated with the different regions generated by the machine-trained model.

12. The method of claim 7, wherein the report distinguishes time values that have been produced by the machine-trained model from at least one time limit value that has been manually selected by the supervisor.

13. A computer-readable storage medium for storing computer-readable instructions, the computer-readable instructions, when executed by one or more hardware processors, performing a method that comprises:
automatically enumerating different instances of input information describing different respective contexts in which a supervisee may interact with a particular application, at least two contexts of the different respective contexts identifying different locations at which the supervisee may interact with the particular application;
for the different instances of input information associated with the different respective contexts, using a machine-trained model to map each instance of input information of said different instances of input information, associated with a particular context, to a particular time limit value, the particular time limit value specifying an amount of time that the supervisee is permitted to interact with the particular application in the particular context, the particular time limit value being automatically generated by the machine-trained model by transforming input features that describe the particular context to the particular time limit value, said using the machine-trained model generating plural time limit values associated with the different respective contexts;
generating a report that describes the plural time limit values generated by the machine-trained model for the particular application for the different respective contexts;
providing the report to a supervisor of the supervisee;
detecting a current context of the supervisee; and
controlling interaction by the supervisee with a given application based on an identified time limit value that applies to the current context and the given application, as generated by the machine-trained model.

14. The computer-readable storage medium of claim 13, wherein a training system produces the machine-trained model based on a set of training examples, each positive training example specifying information regarding a particular scenario paired with a specified time limit value for the scenario.

15. The computer-readable storage medium of claim 13, wherein the machine-trained model determines the particular time limit value for the particular application based, in part, on a context signal provided by another machine-trained model that describes a category associated with the particular application.

16. The computer-readable storage medium of claim 13, wherein the report includes different user interface presentations that present information regarding the different respective contexts and associated time limit values in different respective ways.

17. The computer-readable storage medium of claim 13, wherein the report also shows a map on a user interface presentation that designates different regions associated with the different respective contexts that have been enumerated, and time limit values associated with the different regions generated by the machine-trained model.

18. The computer-readable storage medium of claim 13, wherein the report distinguishes time values that have been produced by the machine-trained model from at least one time limit value that has been manually selected by the supervisor.

* * * * *